United States Patent
Williams

(10) Patent No.: US 9,363,871 B2
(45) Date of Patent: Jun. 7, 2016

(54) LIGHTING DEVICE

(71) Applicant: Nicolas Paul Williams, Powys (GB)

(72) Inventor: Nicolas Paul Williams, Powys (GB)

(73) Assignee: LITONICS LIMITED, Knighton, Powys (GB)

( * ) Notice: Subject to any disclaimer, the term of this patent is extended or adjusted under 35 U.S.C. 154(b) by 0 days.

(21) Appl. No.: 14/398,908

(22) PCT Filed: May 2, 2013

(86) PCT No.: PCT/GB2013/051141
§ 371 (c)(1),
(2) Date: Nov. 4, 2014

(87) PCT Pub. No.: WO2013/164625
PCT Pub. Date: Nov. 7, 2013

(65) Prior Publication Data
US 2015/0091451 A1  Apr. 2, 2015

(30) Foreign Application Priority Data

May 4, 2012 (GB) .................................. 1207914.1

(51) Int. Cl.
*H05B 37/00* (2006.01)
*H05B 37/02* (2006.01)
(Continued)

(52) U.S. Cl.
CPC ........ *H05B 37/0272* (2013.01); *H01R 33/9453* (2013.01); *H02J 9/005* (2013.01);
(Continued)

(58) Field of Classification Search
CPC .................................. G09G 3/10; H05B 37/00
USPC .......... 315/160–164, 200 R, 185 R, 246, 274, 315/275, 276, 291
See application file for complete search history.

(56) References Cited

U.S. PATENT DOCUMENTS

| 4,323,820 A | 4/1982 | Teich |
| 4,454,452 A | 6/1984 | Feldstein |

(Continued)

FOREIGN PATENT DOCUMENTS

| DE | 20 2010 005 615 U1 | 11/2004 |
| EP | 2 163 808 | 3/2010 |

(Continued)

OTHER PUBLICATIONS

International Search Report for International Application No. PCT/GB2013/051141 mailed Aug. 21, 2013 (2 pages).

(Continued)

*Primary Examiner* — Minh D A
(74) *Attorney, Agent, or Firm* — Merchant & Gould P.C.

(57) ABSTRACT

A lighting control includes a primary and a secondary input power connection for connection to a primary (mains) and a secondary (battery) power supply respectively, control circuitry for controlling delivery of power from the input power connections to one or more light sources, sensing circuitry configured to sense an external impedance coupled, in use, to the primary input power connection and a controller for determining a present operating state of the one or more light sources. The controller includes a latching module adapted to maintain a state information indicating the present operating state of the one or more light sources. The control circuitry is operable to control delivery of power to the one or more light sources in dependence upon the sensed impedance measure and the determined operating state. The lighting devices may be installed in a conventional lighting circuit that uses momentary toggle switches.

23 Claims, 17 Drawing Sheets

(51) Int. Cl.
*H02J 9/06* (2006.01)
*H05B 33/08* (2006.01)
*H05B 35/00* (2006.01)
*H01R 33/945* (2006.01)
*H02J 9/00* (2006.01)
*F21V 3/00* (2015.01)
*F21K 99/00* (2016.01)
*F21S 9/02* (2006.01)
*F21Y 101/02* (2006.01)
*F21V 23/04* (2006.01)

(52) U.S. Cl.
CPC ........... *H02J 9/065* (2013.01); *H05B 33/0806* (2013.01); *H05B 35/00* (2013.01); *H05B 37/02* (2013.01); *F21K 9/135* (2013.01); *F21S 9/022* (2013.01); *F21V 3/00* (2013.01); *F21V 23/045* (2013.01); *F21Y 2101/02* (2013.01); *Y02P 80/11* (2015.11)

(56) References Cited

U.S. PATENT DOCUMENTS

| | | | |
|---|---|---|---|
| 4,636,910 | A | 1/1987 | Chadwick |
| 4,727,291 | A | 2/1988 | Bavaro |
| 4,977,351 | A | 12/1990 | Bavaro et al. |
| 5,233,273 | A | 8/1993 | Waki et al. |
| 5,451,843 | A | 9/1995 | Kahn et al. |
| 5,734,229 | A | 3/1998 | Bavaro et al. |
| 6,045,232 | A | 4/2000 | Buckmaster |
| 6,097,108 | A | 8/2000 | Tweed |
| 6,168,282 | B1 | 1/2001 | Chien |
| 6,376,932 | B1 | 4/2002 | Yang |
| 6,452,217 | B1 | 9/2002 | Wojnarowski et al. |
| 6,876,159 | B1 | 4/2005 | Wu et al. |
| 7,102,295 | B2 | 9/2006 | Chen |
| 7,952,303 | B2 | 5/2011 | Xiong et al. |
| 8,232,746 | B2 | 7/2012 | Yufuku et al. |
| 2003/0006709 | A1 | 1/2003 | Tabell |
| 2003/0141819 | A1 | 7/2003 | Cojocary |
| 2004/0012959 | A1 | 1/2004 | Robertson et al. |
| 2004/0257271 | A1* | 12/2004 | Jacobson et al. ............... 342/175 |
| 2004/0264187 | A1 | 12/2004 | Vanderschuit |
| 2005/0265035 | A1 | 12/2005 | Brass et al. |
| 2006/0193131 | A1 | 8/2006 | McGrath et al. |
| 2007/0038390 | A1* | 2/2007 | Mansfield ...................... 702/45 |
| 2007/0189001 | A1 | 8/2007 | Nielson et al. |
| 2007/0200433 | A1 | 8/2007 | Kelty |
| 2007/0247840 | A1 | 10/2007 | Ham |
| 2008/0030140 | A1 | 2/2008 | Pape et al. |
| 2008/0088180 | A1 | 4/2008 | Cash et al. |
| 2008/0175216 | A1 | 7/2008 | Nasco |
| 2008/0203937 | A1 | 8/2008 | Hooijer et al. |
| 2008/0203939 | A1 | 8/2008 | Pekarshi et al. |
| 2008/0222431 | A1 | 9/2008 | Paniagua et al. |
| 2008/0304249 | A1 | 12/2008 | Davey et al. |
| 2008/0316755 | A1 | 12/2008 | Zheng et al. |
| 2009/0152952 | A1 | 6/2009 | Evans, Sr. |
| 2009/0161356 | A1 | 6/2009 | Negley et al. |
| 2009/0175041 | A1 | 7/2009 | Yuen et al. |
| 2010/0133578 | A1 | 6/2010 | Pickard et al. |
| 2010/0135000 | A1 | 6/2010 | Smith, III et al. |
| 2010/0176743 | A1 | 7/2010 | Lee et al. |
| 2010/0194277 | A1 | 8/2010 | Yoo |
| 2010/0244719 | A1 | 9/2010 | Mans |
| 2010/0270861 | A1 | 10/2010 | Chen |
| 2010/0327766 | A1 | 12/2010 | Recker et al. |
| 2011/0057572 | A1 | 3/2011 | Kit et al. |
| 2011/0068692 | A1 | 3/2011 | Tian et al. |
| 2011/0128742 | A9 | 6/2011 | Yuen et al. |
| 2011/0163672 | A1 | 7/2011 | Shew et al. |
| 2011/0285315 | A1* | 11/2011 | Matthews et al. ............. 315/294 |
| 2011/0309759 | A1* | 12/2011 | Shteynberg et al. .......... 315/201 |
| 2012/0001548 | A1 | 1/2012 | Recker et al. |
| 2012/0235492 | A1 | 9/2012 | Inoue et al. |
| 2015/0091451 | A1 | 4/2015 | Williams |

FOREIGN PATENT DOCUMENTS

| | | |
|---|---|---|
| EP | 2 384 087 | 9/2012 |
| GB | 2 447 495 | 9/2008 |
| GB | 2 455 107 | 6/2009 |
| GB | 2 466 790 | 7/2010 |
| GB | 2 483 113 | 2/2012 |
| GB | 2 489 505 | 10/2012 |
| JP | 8-264010 | 10/1996 |
| JP | 2000-92717 | 3/2000 |
| JP | 2001-176680 | 6/2001 |
| JP | 2002-359087 | 12/2002 |
| WO | WO 01/71244 | 9/2001 |
| WO | WO 2005/045312 | 5/2005 |
| WO | WO 2006/030432 | 3/2006 |
| WO | WO 2006/064209 | 6/2006 |
| WO | WO 2007/004190 | 1/2007 |
| WO | WO 2008/124701 | 10/2008 |
| WO | WO 2009/017329 | 2/2009 |
| WO | WO 2009/067074 | 5/2009 |
| WO | WO 2010/043923 | 4/2010 |
| WO | WO 2010/070676 | 6/2010 |
| WO | WO 2010/090012 | 8/2010 |
| WO | WO 2010/099755 | 9/2010 |
| WO | WO 2010/127366 | 11/2010 |
| WO | WO 2011/014111 | 2/2011 |
| WO | WO 2011/042781 | 4/2011 |
| WO | WO 2012/013168 | 10/2012 |

OTHER PUBLICATIONS

International Search Report for International Application No. PCT/GB2012/050693 mailed Sep. 19, 2012 (3 pages).
Panasonic Lithium Ion, Features & Benefits, Version 13.11R1, Copyright 2012, Energy Company, http://industrial.panasonic.com/lecs/www-data/pdf2/ACI4000/ACI4000CE17.pdf, 1 page.
VARTA Rechargeable Lithium-Ion Cylindrical, Data Sheet, Jun. 9, 2010/RH 702507, VARTA Microbattery GmbH, http://www.varta-microbattery.com/applications/mb_data/documents/data_sheets/ds56621.pdf, one page.
Samsung SDI, Specification of Product for Lithium-ion Rechargeable Cell, Jan. 2005, Samsung SDI Co., Ltd., Mobile Energy Division, http://www.batteryonestop.com/baotongusa/products/datasheets/li-ion/Samsung-SDI- ICR18650-26A.pdf, 16 pages.
Steve McCluer, Wanted: Real World Battery Life Prediction Abstract, American Power Conversion Corporation (APC), http://www.battcon.com/papersfinal2003/mccluerpaperfinal2003.pdf, 8 pages.
Panasonic Nickel Cadmium Batteries, Technical Handbook '02/'03, PDF File Technical Handbook, Copyright 2002, Matsushita Battery Industrial Co., Ltd., http://media.digikey.com/pdf/Data%20Sheets/Panasonic%20Batteries%20PDFS/Ni%20Cd%20Catalog%202002-03%20v1.pdf, 87 pages.
Energizer Product Data Sheet, Energizer NH15-2300 Specifications, Form No. EBC-7102WB, http://data.energizer.com/PDFs/nh15-2300.pdf, 1 page.
Cree Product Family Data Sheet, Cree XLamp XM-L LEDs, CLD-DS33 REV 10A, Copyright 2010-2015 Cree, Inc., http://www.cree.com/~/media/files/cree/led%20components%20and%20modules/xlamp/data%20and%20binning/xlampxml.pdf 14 pages.
Co-pending U.S. Appl. No. 14/728,622, filed Jun. 2, 2015 (76 pages).
Form PTO-892, issued in Notice of Allowance for co-pending U.S. Appl. No. 14/728,622, Nov. 27, 2015.

\* cited by examiner

LIGHTING DEVICE

BACKGROUND

The present invention relates to lighting devices and in particular to lighting devices that have additional components and circuitry to enable the lighting device to emit light using electrical energy from a secondary power supply (such as a battery) if the primary power supply (such as a mains supply) is interrupted.

In the event of an electrical power supply failure to a conventional lighting device, the absence of any immediate or sustained ambient light presents numerous safety, welfare, convenience and security concerns to the occupants of any affected public, commercial, industrial or residential buildings and areas. Existing standby or emergency lighting systems typically take the form of a bespoke unit, primarily designed for industrial and commercial environments, which solely function in the event of a power failure (power outage). These existing products typically require dedicated installation, additional wiring and regular maintenance and testing, adding further to purchase and ownership cost. Light is usually only produced in the event of a mains power failure and until either the secondary source is exhausted or primary power is restored, and during that time the user cannot control the light readily, such as to conserve the limited electrical storage capacity when light is not required. Further still, these lighting devices are usually functionally termed "non-maintained" and are only intended to give emergency rather than mainstream illumination when the primary mains power supply is available. Therefore, the associated emergency lighting apparatus is operationally redundant whenever mains power is available and primary lighting is used instead.

Some existing lighting devices are arranged to produce uninterrupted primary illumination from either primary or secondary supplies. These devices are termed "maintained". In antithesis, lighting devices termed "maintained" are generally intended to produce uninterrupted primary illumination sustained from either mains or secondary electrical storage sources. Maintained devices typically have no switch on supply, hence require permanent mains feed, thus light is usually continuous with the battery being used if the permanent mains feed fails.

The inventor has recently proposed a solution to this problem by combining standard and emergency lighting into one unit that may retro-fit any existing non-emergency light fitting or wiring installation and which may replace or augment any conventional lighting devices powered from the mains power supply.

The proposed electric lighting device (described in GB 2447495) has circuitry that can detect mains failure and which can provide power to the lighting device from a backup battery provided in or close to the lighting device. One important function of this earlier lighting device is that it is able to distinguish between a failure in the mains power supply and a user controlled removal of the power supply at a light switch. As described in the inventor's earlier GB application, this is achieved by evaluating the impedance across the supply terminals. When there is a mains power failure and the light is switched on, the impedance will be low; whereas when the user has switched off the light at a light switch the impedance will be high. The inventor has also proposed a number of improvements to the lighting device described in this earlier GB application. These improvements are described in PCT/GB2012/050695, the contents of which are incorporated herein by reference.

However, these earlier devices proposed by the inventor are intended to be installed in a conventional lighting circuit that uses conventional bi-polar isolating switches and cannot detect if there is a primary power supply failure when one of the switches on the circuit is open circuit. Additionally, the device cannot recharge its internal battery as soon as the primary power supply is re-established if any of those switches is open circuit. Therefore, whilst the inventor's proposed lighting devices are useful for installation in existing lighting circuits, they may not meet some of the more stringent regulatory requirements for emergency lighting systems.

SUMMARY OF INVENTION

An aim of embodiments of the invention, therefore, is to provide an alternative lighting device (and parts thereof) that will allow the lighting device to meet more of the regulatory requirements imposed on emergency lighting systems.

According to one aspect, the present invention provides a lighting control apparatus comprising: a primary input power connection for connection to a primary power supply; a secondary input power connection for receiving secondary power from a secondary power supply; and electronic circuitry arranged to control power delivery to one or more light sources; wherein the electronic circuitry comprises: control circuitry for controlling delivery of power from said input power connections to one or more light sources; sensing circuitry configured to sense an external impedance coupled, in use, to the primary input power connection; and determining means for determining a present operating state of the one or more light sources; and wherein the control circuitry is operable to control delivery of power to the one or more light sources in dependence upon the sensed impedance measure and the determined operating state of the one or more light sources.

In one embodiment, the determining means comprises a latching module that maintains state information indicating the present operating state of the one or more light sources. Alternatively the determining means may comprise one or more sensors that sense, for example, the light output by the one or more light sources or the electrical current or voltage applied to the light sources.

In the case that a latching module is used, the control means may control the state information maintained by said latching module in dependence upon detected changes in impedance sensed by said sensing circuitry.

The determining means preferably determines state information indicating a present illumination state of the one or more light sources.

The determining means may determine present state information indicative of one of at least two different illumination levels of said one or more light sources. Preferably the determining determines present state information indicative of one of at least three different illumination levels of said one or more light sources.

In one embodiment, the control circuitry generates control signals for controlling dimming of the one or more light sources in dependence upon changes in the sensed impedance and the determined operating state of the one or more light sources.

The control circuitry may control delivery of power to the one or more light sources independent of the presence of primary power at the primary input power connection. That is the control circuitry may not deliver power from the primary input power connection to the light sources when it is available at the primary input power connection.

In one embodiment, the control circuitry detects removal of a primary power supply from said primary input power connection and uses the sensed impedance to distinguish between: i) removal of the primary supply from the primary input power connection by a user opening a switch coupled, in use, to the control apparatus; and ii) primary power supply failure; and, upon detection of primary power supply failure, controls power delivery to the one or more light sources using power received at the secondary input power connection to provide emergency lighting functionality.

If the control circuitry is controlling power delivery such that no power is being delivered to the one or more light sources when the control circuitry detects the primary power supply failure, the control circuitry preferably provides power to the one or more light sources using power from the secondary input power connection.

The sensing means may sense the external impedance by applying measurement pulses (current or voltage) to the primary input power connection to obtain a measure of said external impedance. In this case, the electronic circuitry may detect transient signals on the primary input power connection, and from these determine the impedance measure.

The electronic circuitry can use the sensed impedance measure to determine if manually operable switches coupled to the primary input power connection are in an open or a closed state.

Preferably the electronic circuitry determines a plurality of measurements of the external impedance and combines two or more of the measurements to determine an average measurement, which it uses to control the power delivery.

The control apparatus is preferably mounted within a single housing that is adapted for connection to a lighting circuit. Preferably, the housing forms part of a lighting device or lamp that is insertable into a conventional lamp holder.

In one embodiment, the control apparatus may send a control signal to one or more lighting devices to control the delivery of power to the one or more lighting devices. In this case, the control apparatus may send the control signal to the one or more lighting devices over a wireless link or over a primary supply line connected, in use, to the primary input power connection.

The control circuitry may control when the sensing circuitry operates to sense the external impedance. For example, the control circuitry may cause the sensing circuitry to initiate sensing when the control circuitry detects the absence of primary power from the primary input power connection.

In one embodiment, the control device has a first mode of operation in which the control circuitry operates in a first operating mode and a second mode of operation in which the control circuitry operates in a second mode of operation and wherein the control device is arranged to operate in the first mode if the primary input power connection is connected to a lighting circuit that provides a substantially permanent primary power supply and is arranged to operate in the second mode if the primary input power connection is connected to a lighting circuit that uses manually operable toggle switches that remove the primary power supply from the primary input power connection.

In this case, the control device may be arranged to operate in said first mode if the primary input power connection is connected to a lighting circuit that uses manually operable momentary switches that, when activated by the user, momentarily remove primary power from the primary input power connection.

The electronic circuitry preferably comprises charging circuitry for using power obtained at the primary input power connection to charge the secondary power supply and wherein the control circuitry causes the charging circuitry to initiate charging of the secondary power supply immediately after the primary power supply is restored to the primary input power connection following a primary power supply failure.

The invention also provides a lighting device comprising: one or more light sources; and a control apparatus according to any of claims 1 to 22 for controlling the application of power to the one or more light sources.

The present invention also provides a kit comprising: a control apparatus according to claim 16 or 17 for generating and transmitting a control signal for controlling the application of power to one or more lighting devices; and one or more lighting devices, each comprising: a primary input power connection for connection to a primary power supply; a secondary input power connection for receiving secondary power from a secondary power supply; and electronic circuitry arranged to receive the control signal from said control apparatus and arranged to control the delivery of power to the one or more light source(s) using power from the primary input power connection or using power from the secondary input power connection in dependence upon the control signal received from the control apparatus.

The present invention also provides a method of controlling power delivery to one or more light sources using a control apparatus, the method comprising: connecting a primary input power connection to a primary power supply; connecting a secondary input power connection to a secondary power supply; and sensing an external impedance coupled to the primary input power connection; determining a present operating state of the one or more light sources; and controlling delivery of power to the one or more light sources in dependence upon the sensed impedance and the determined operating state of the one or more light sources.

These and other aspects of the invention will become apparent from the following description of exemplary embodiments which are described below with reference to the accompanying Figures in which.

Figure 1:
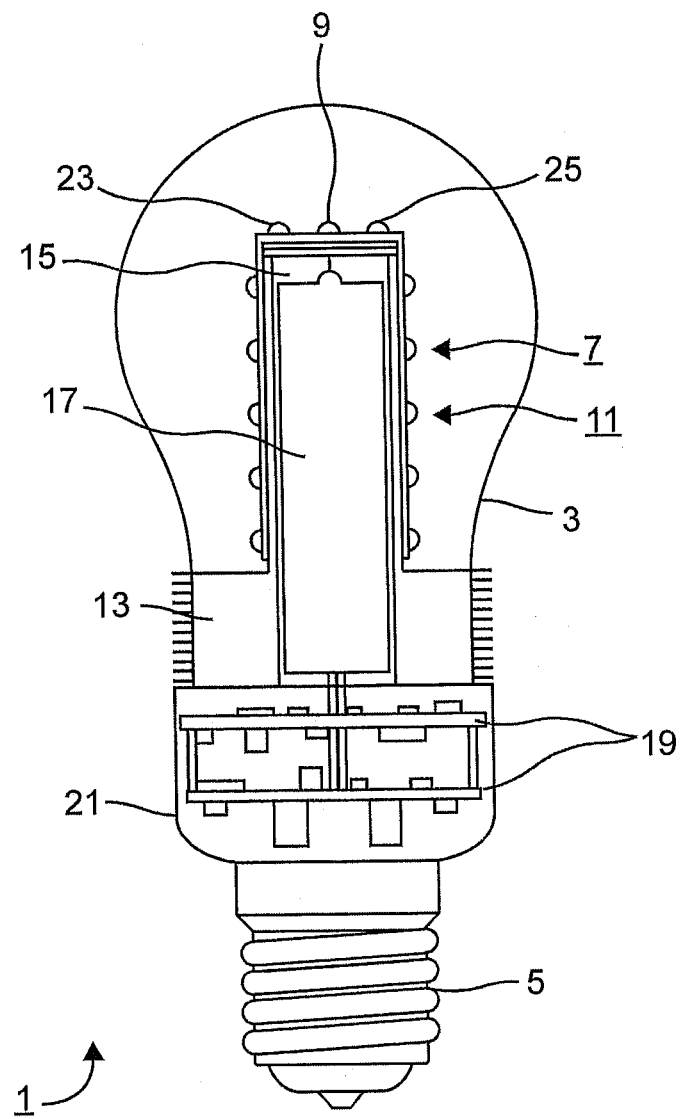
FIG. 1 is a schematic view of one embodiment of a lighting device for connection to a conventional lamp holder and wiring installation (conventional or not) and which can provide a backup light function in the event of mains power failure.
Figure 3:
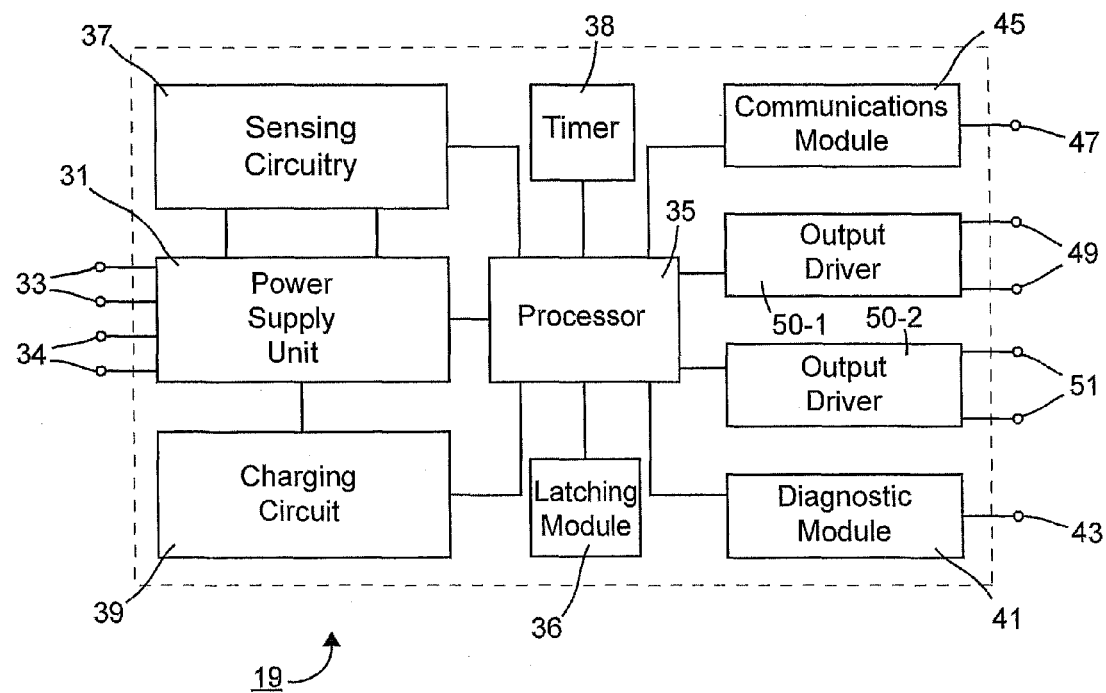
FIG. 3 is a block diagram illustrating the main components of electronic circuitry forming part of the lighting device shown in FIG. 1.
Figure 4A:
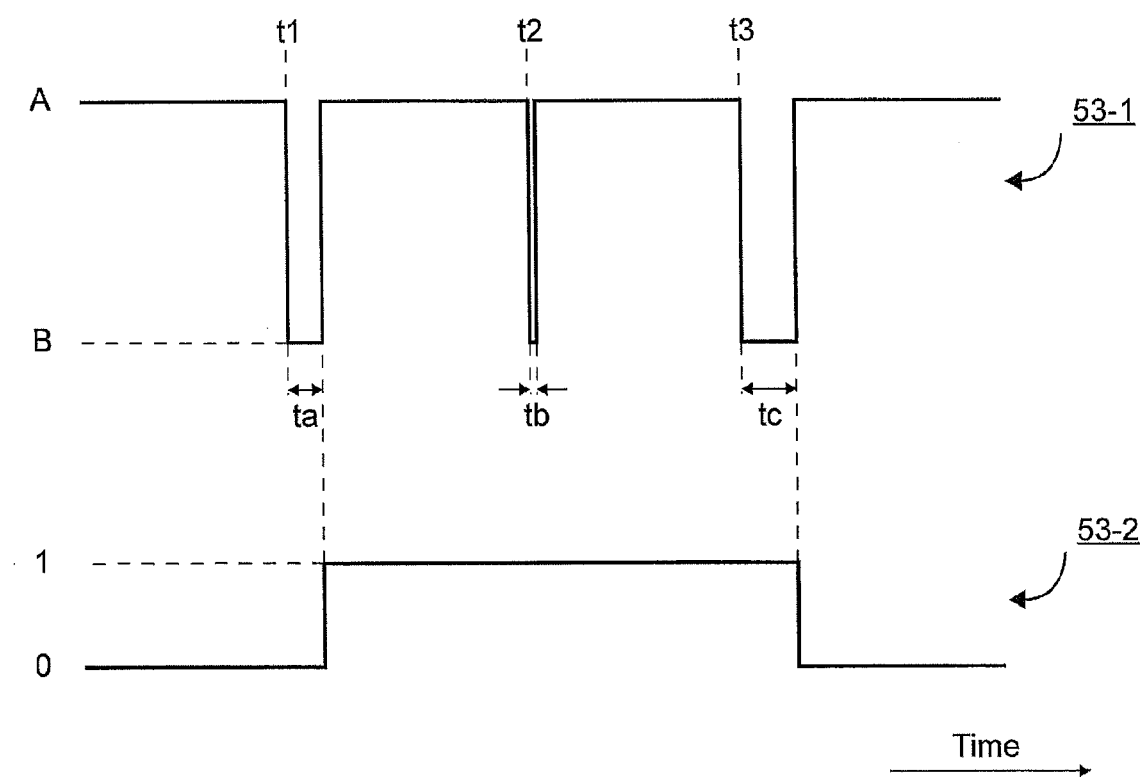
Figure 4B:
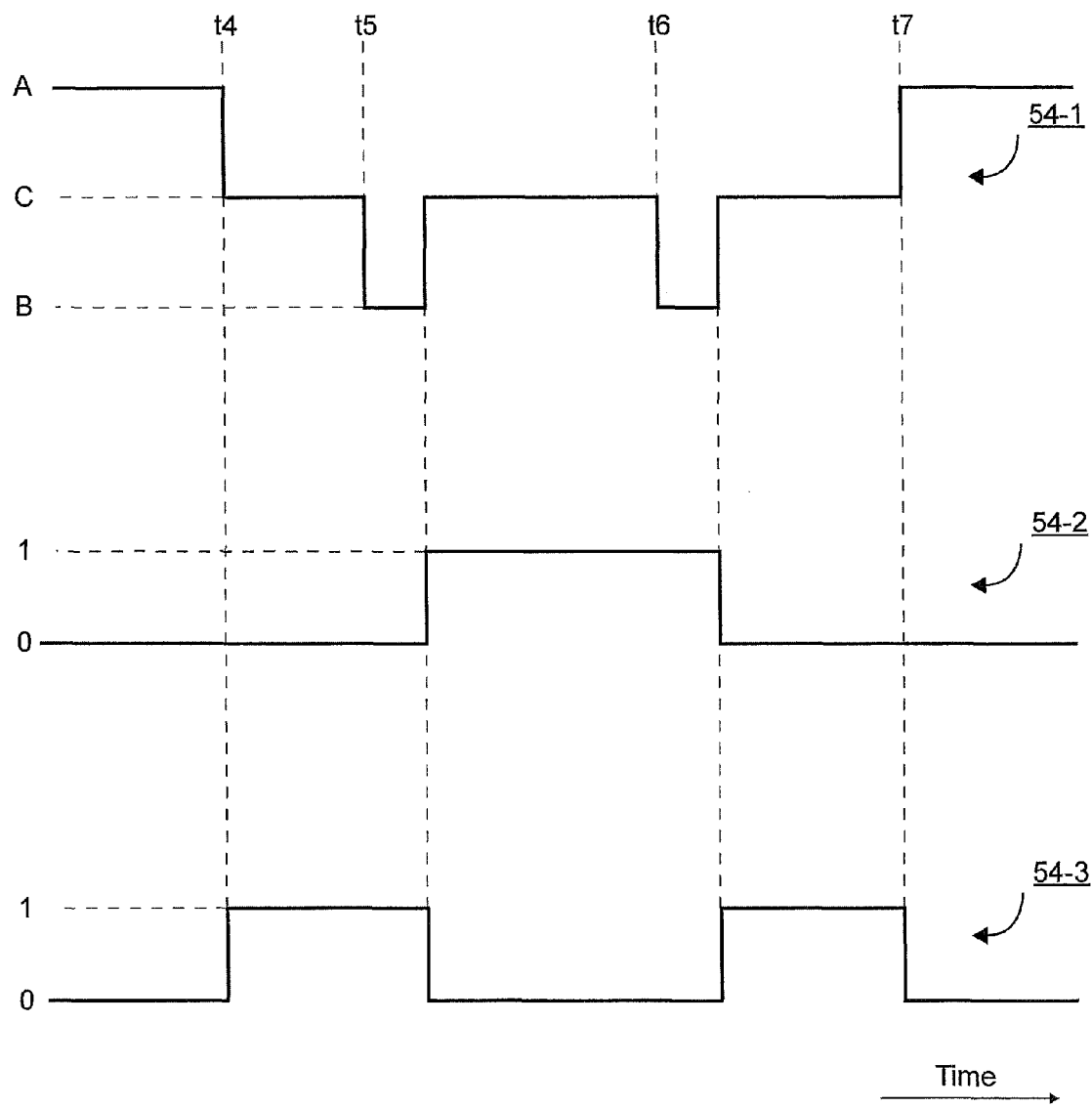
Figure 4C:
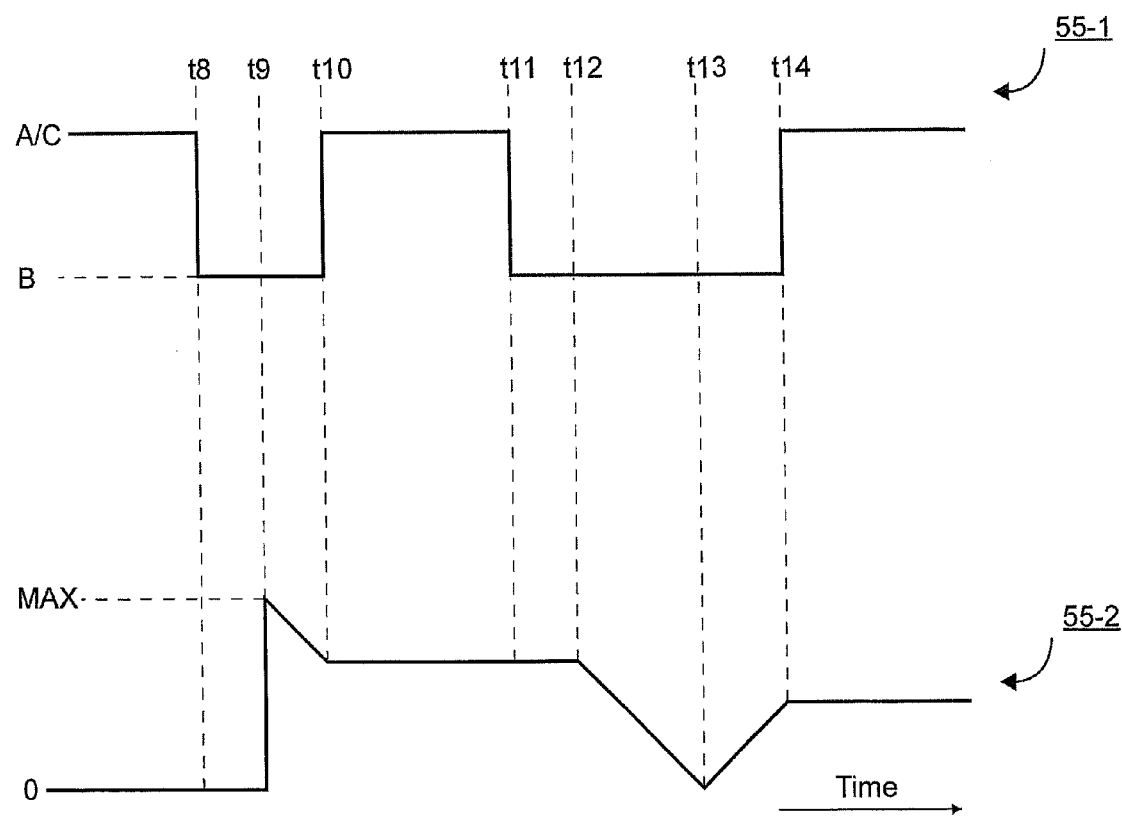
Figure 5:
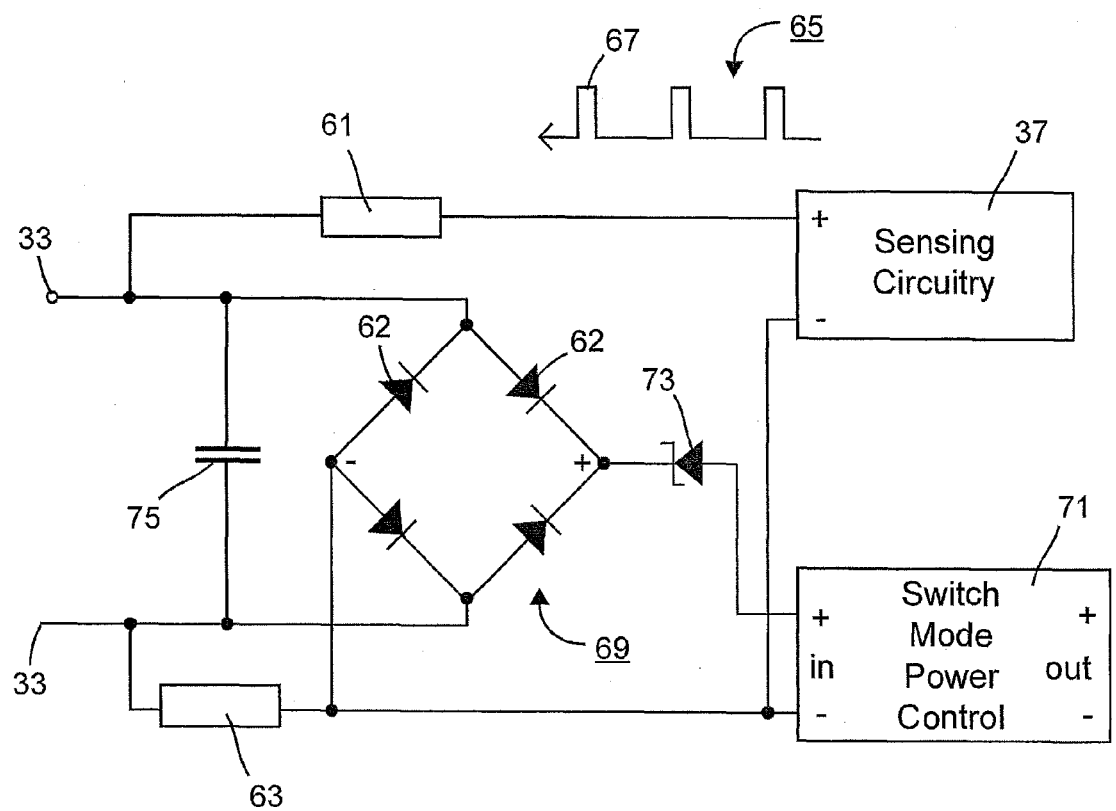
Figure 6A:
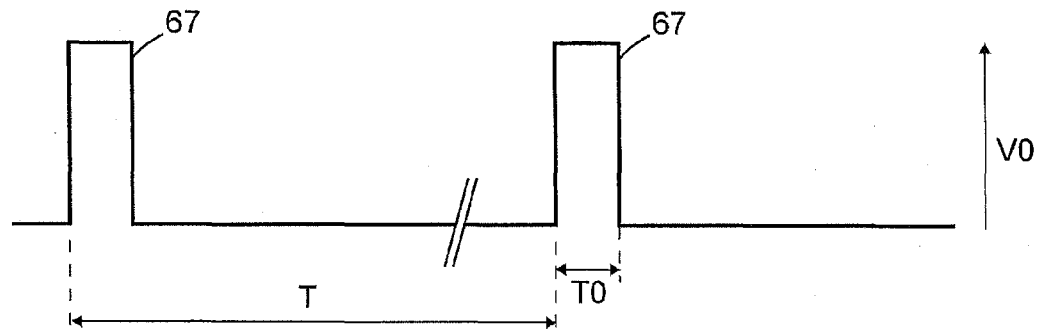
Figure 6B:
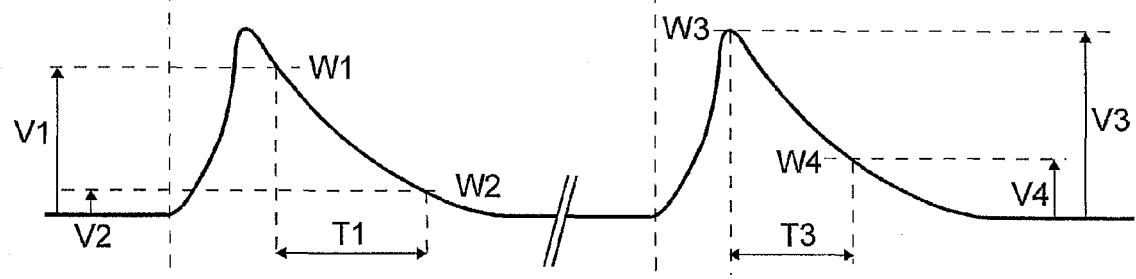
Figure 6C:
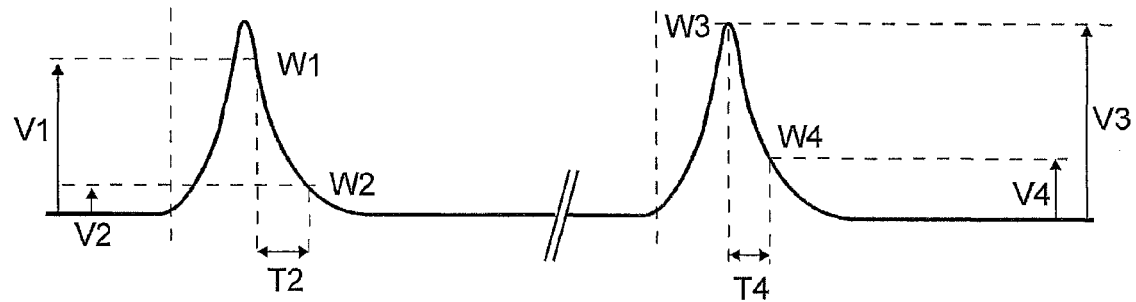
Figure 6D:
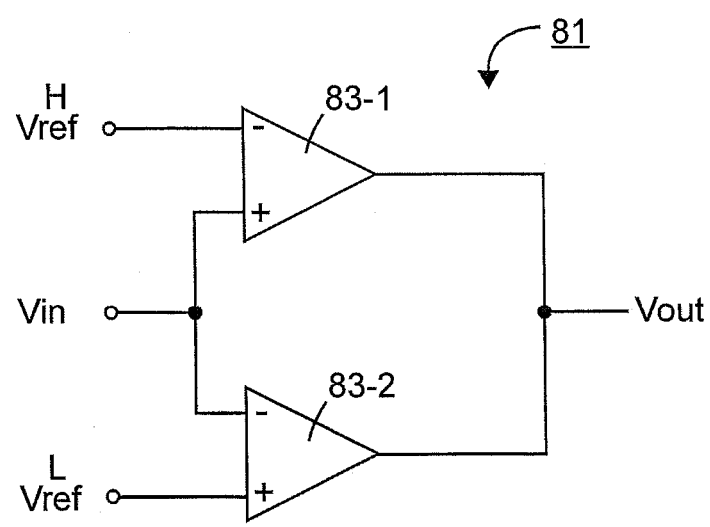
Figure 7:
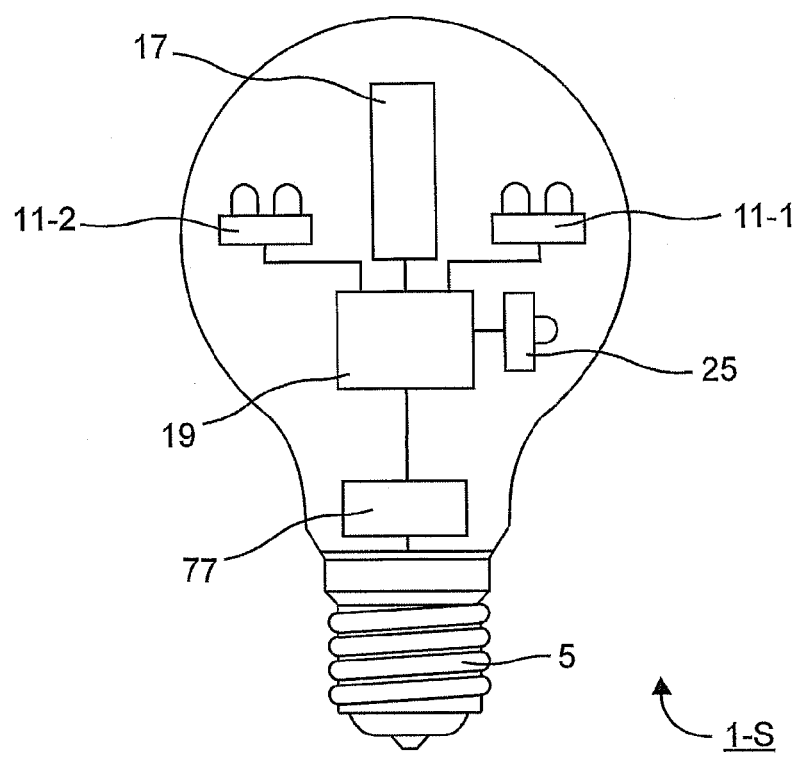
Figure 7:
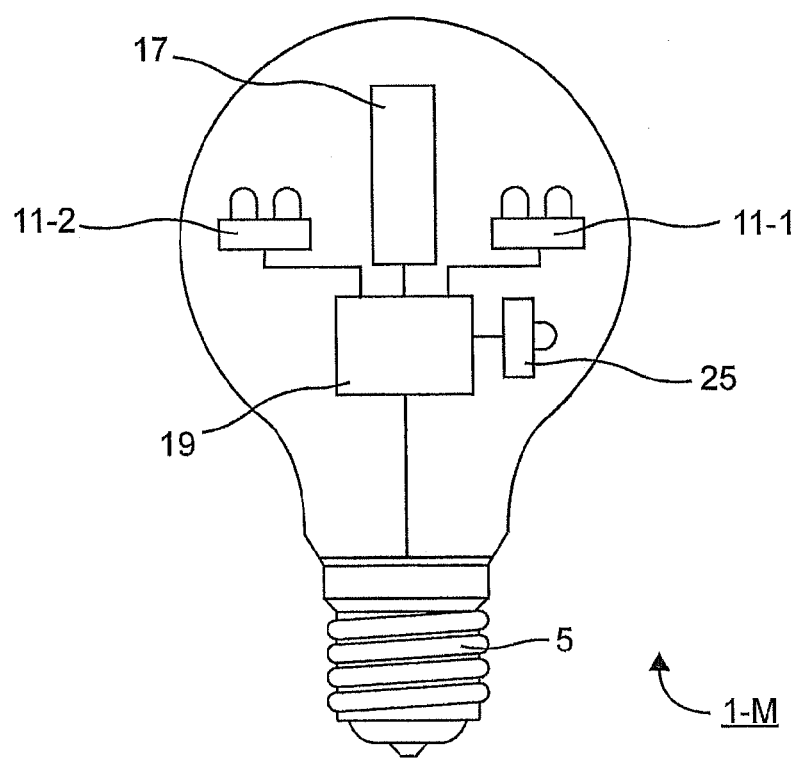
Figure 8:
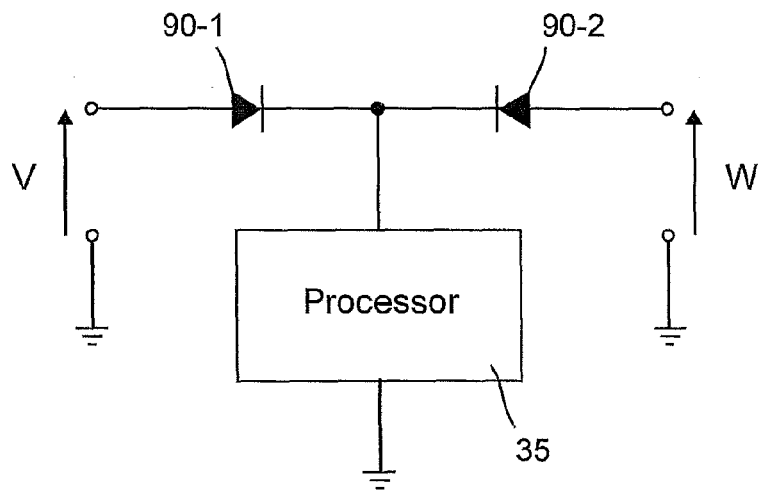
Figure 9:
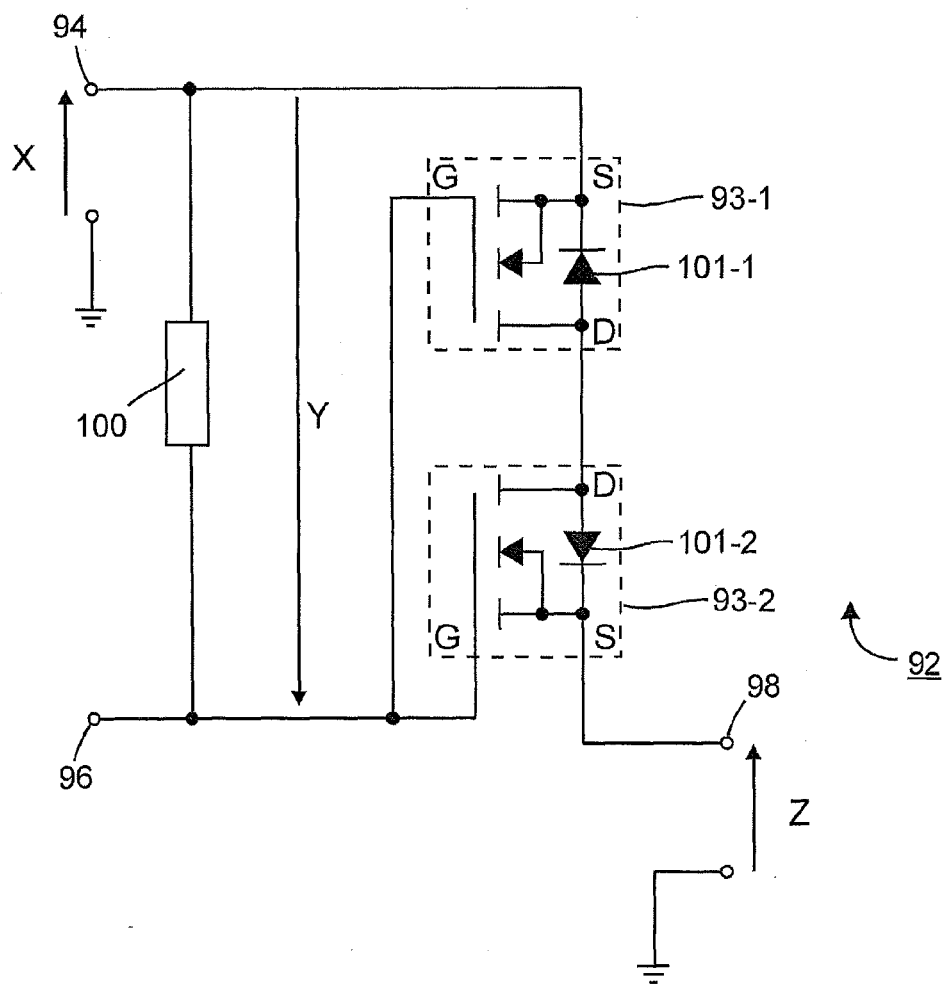

FIGS. 4a to 4c schematically illustrate state transitions within the lighting device shown in FIG. 1 and the output of a latching module forming part of the lighting control circuitry;

FIG. 5 is a schematic diagram illustrating the electrical connection of a sensing circuit and a switch mode power control unit forming part of the circuitry shown in FIG. 3;

FIG. 6a is a plot illustrating a sequence of voltage pulses generated by the sensing circuitry shown in FIG. 5;

FIG. 6b illustrates a sense signal sensed by the sensing circuitry shown in FIG. 5 obtained when primary power input terminals of the circuitry shown in FIG. 5 are connected to a high impedance;

FIG. 6c illustrates a sense signal sensed by the sensing circuitry shown in FIG. 5 obtained when primary power input terminals of the circuitry shown in FIG. 5 are connected to a low impedance load;

FIG. 6d schematically illustrates the components of a window comparator forming part of the sensing circuitry shown in FIG. 5;

FIG. 7 illustrates the way in which two lighting devices can operate in a master/slave configuration;

FIG. 8 is a circuit diagram illustrating the way in which a processor forming part of the circuitry shown in FIG. 3 may be powered either from a power signal derived from a primary power supply or by a power signal derived from a secondary power supply;

FIG. 9 illustrates a circuit having two back-to-back MOSFET switches used to provide load control between primary and secondary power supplies.

Figure 10A:
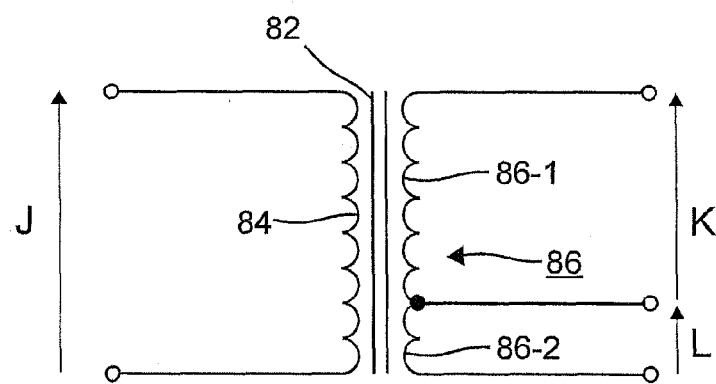
Figure 10B:
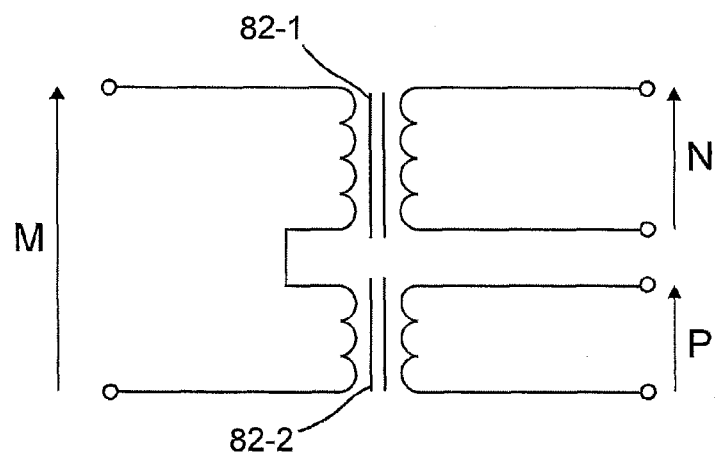
Figure 10C:
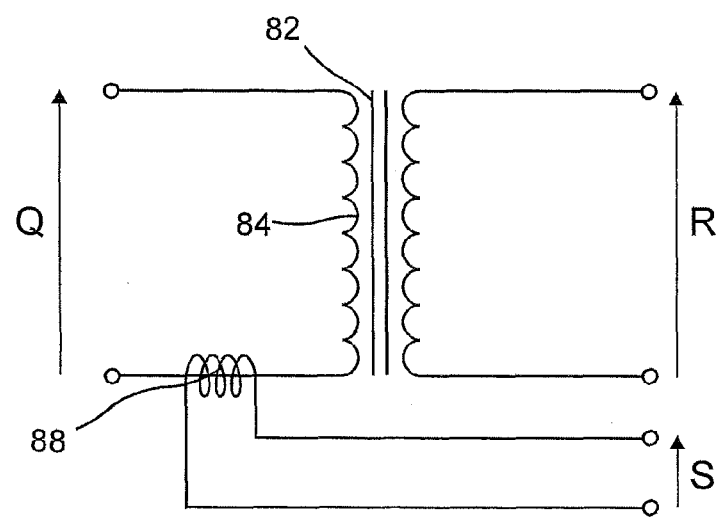
Figure 11:
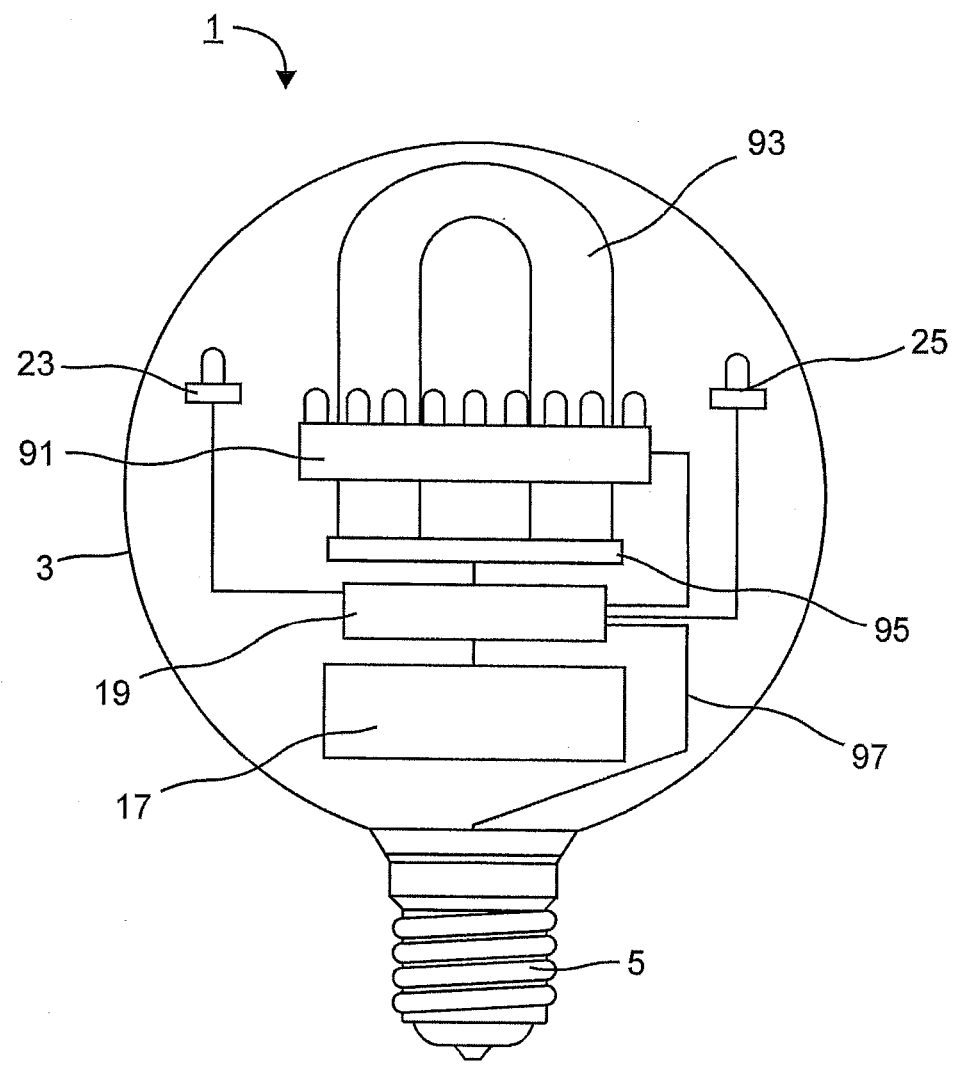
Figure 12A:
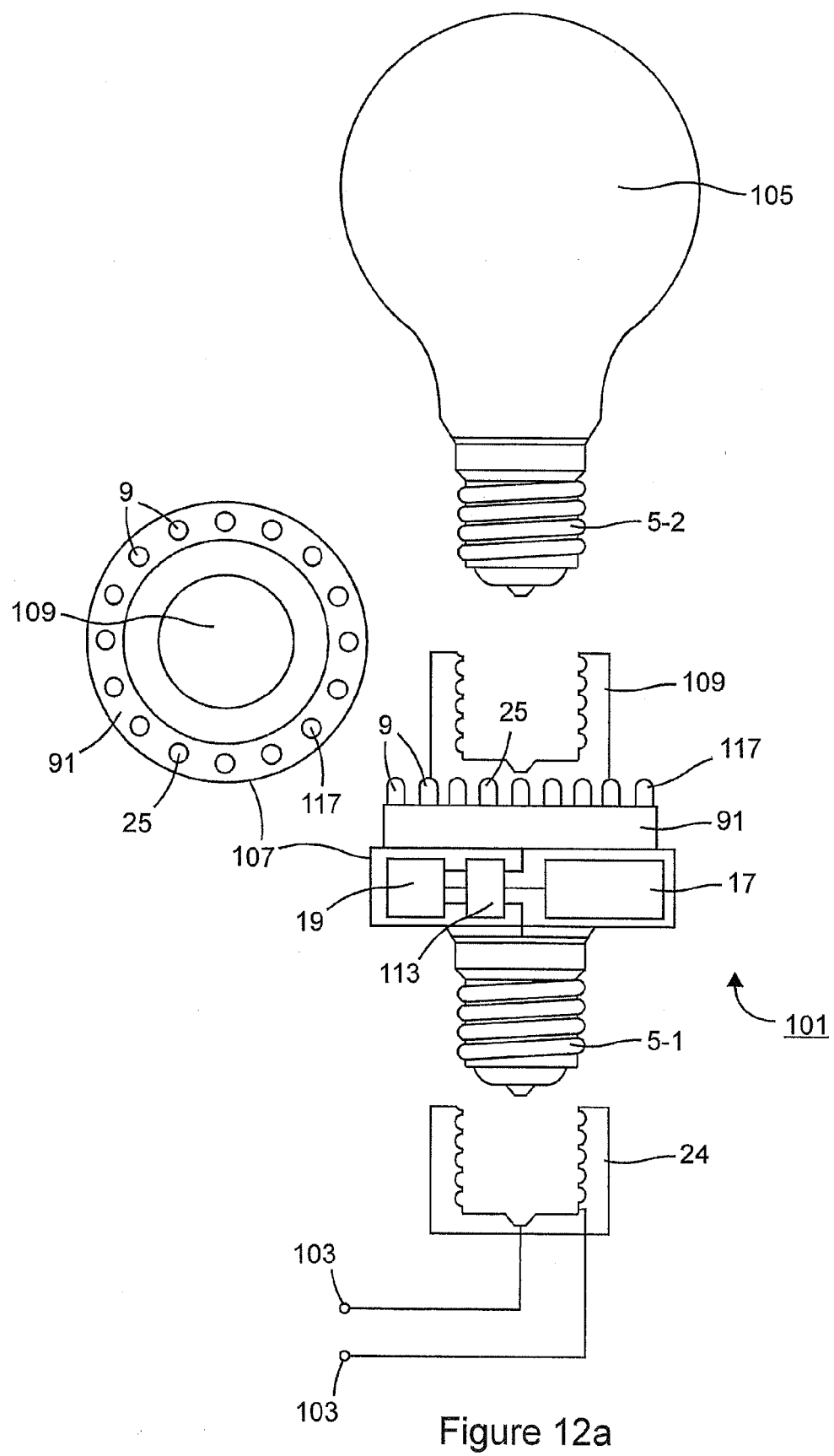
Figure 12B:
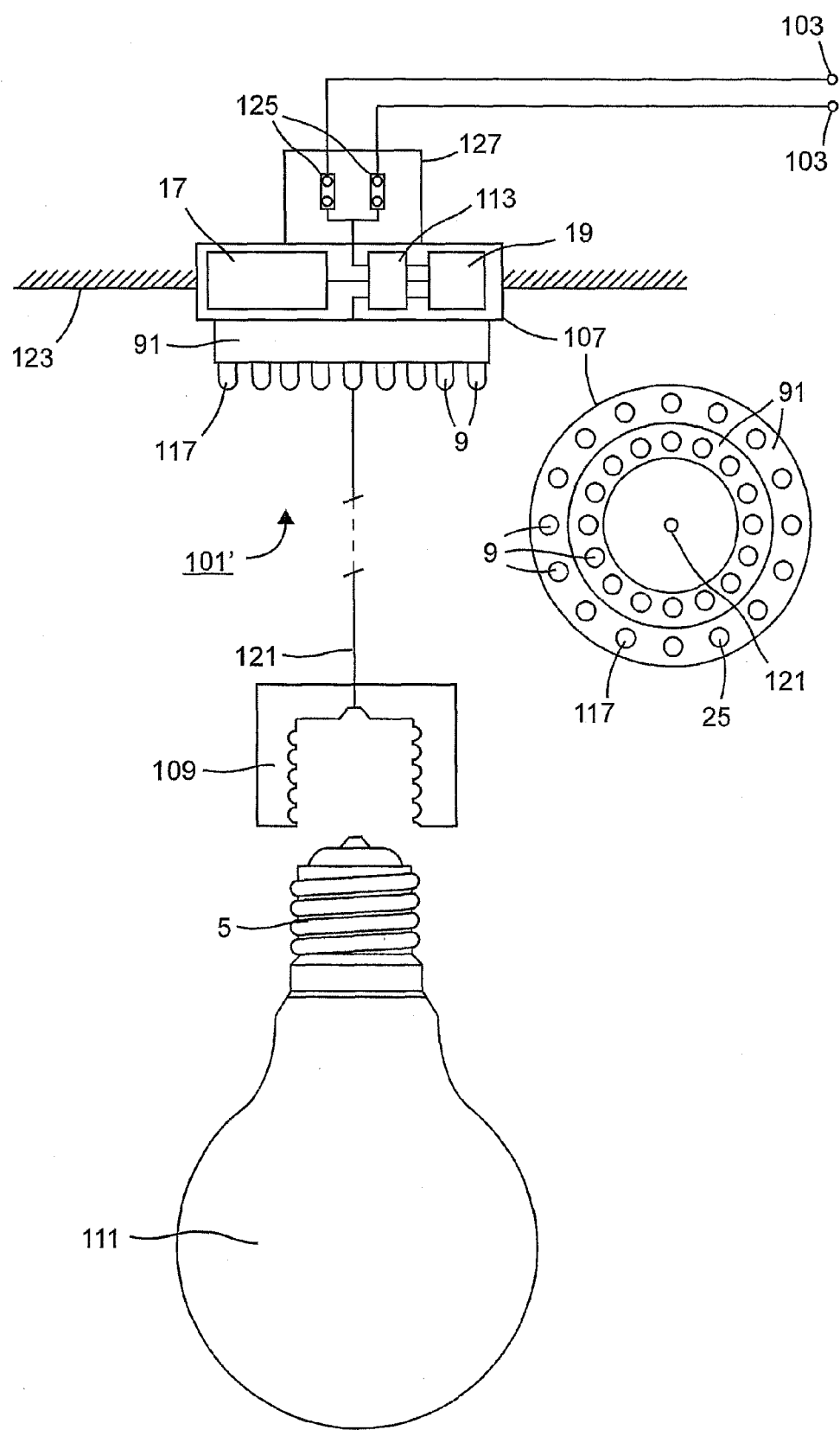
Figure 13:
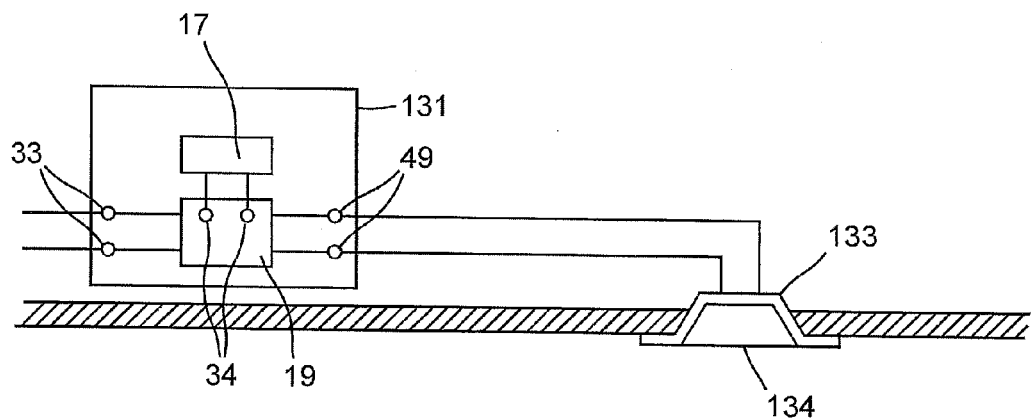
Figure 14:
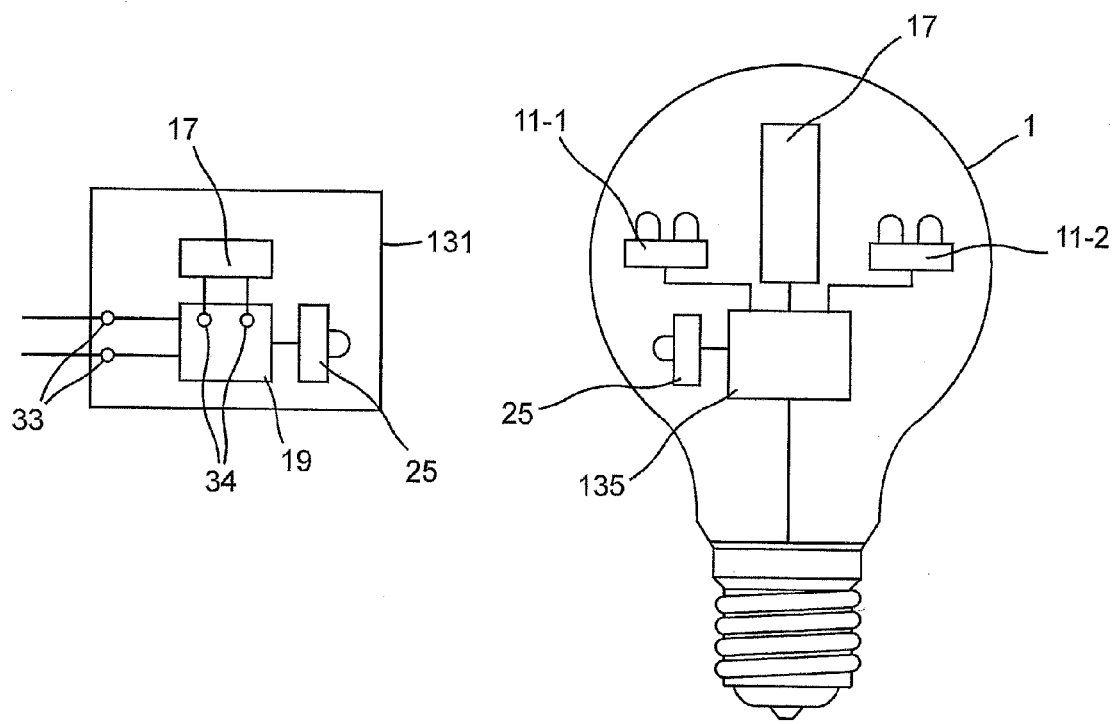

FIGS. 10a, 10b and 10c illustrate alternative arrangements to that shown in FIG. 5 for coupling a sensing circuit and a power supply unit of the circuitry shown in FIG. 3 to a mains input supply;

FIG. 11 is a schematic view of an alternative lighting device embodying the present invention;

FIG. 12a illustrates an in-line adaptor embodying the present invention which can provide emergency lighting upon mains power failure to a conventional light source;

FIG. 12b schematically illustrates an in-line adaptor which is semi-permanently installed and controls power delivery to a pendant light attached thereto;

FIG. 13 schematically illustrates an embodiment in which electronic circuitry like that shown in FIG. 3 is built into a power supply unit used for powering conventional low voltage lights; and FIG. 14 schematically illustrates an embodiment in which electronic circuitry like that shown in FIG. 3 is provided in a remote control device and used to control the operation of one or more lighting devices.

OVERVIEW

FIG. 1 shows an example of a lighting device 1 embodying the present invention. In this instance, the lighting device 1 is in the form of a traditional look-a-like light bulb or lamp that has an optically transparent/translucent housing 3 that is mechanically coupled to a fitting 5. The fitting 5 is for connecting the lighting device 1 to a conventional lamp holder (in this case illustrated as a conventional screw type holder), which in turn connects the lighting device 1 to a primary power supply.

One or more light sources 7 are provided within the transparent housing 1. In this embodiment, the light sources 7 include a plurality of light emitting diodes 9. In this example, the multiple light emitting diodes 9 are arranged in one or more arrays 11 so that the lighting device 1 has a wide angle of illumination. To achieve optimum efficacy, efficiency and life span, the LED array(s) 11 are mechanically fixed and thermally connected to a heatsink 13. The structure and function of the heatsink 13 is described in the applicant's earlier GB application (GB 1014428.5), the content of which is incorporated herein by reference. As shown in FIG. 1, the heatsink 13 has a cavity 15 in which a battery 17 is mounted. As will be explained in more detail below, the battery 17 is for powering the light source(s) 7 in the event of a mains power failure.

Electronic circuitry 19 is provided within a base 21 or cavity of heatsink 13 of the lighting device 1. The electronic circuitry 19 includes circuitry for sensing when there is a mains primary power failure and circuitry for coupling the battery 17 to the light sources 7 to provide light during such a primary power failure. The preferred lighting device 1 has a number of different operating modes that allow it to work in different lighting installations. In one mode, the lighting device 1 can be installed in a conventional lighting circuit having one or more manually operable switches for isolating the lighting device 1 from the primary power supply to switch the lighting device 1 on and off. The electronic circuitry 19 is able to sense when such switches are open and when they are closed. In another mode, the lighting device 1 can be installed in a lighting circuit that connects the lighting device permanently to the primary power source and that has one or more manually operable switches that, when operated, temporarily break (or otherwise alter) the connection between the lighting device and the primary power supply. The lighting device 1 can detect the operation of the switch and can alter its operation accordingly. The lighting device 1 can be factory or user configured into the different operating modes or it can automatically sense the type of lighting circuit in which it is installed and configure its operating mode accordingly, such as by analysis upon first turn on, or combinations of such methods thereof.

Lighting Circuit

Conventional Lighting Circuit

Figure 2A:
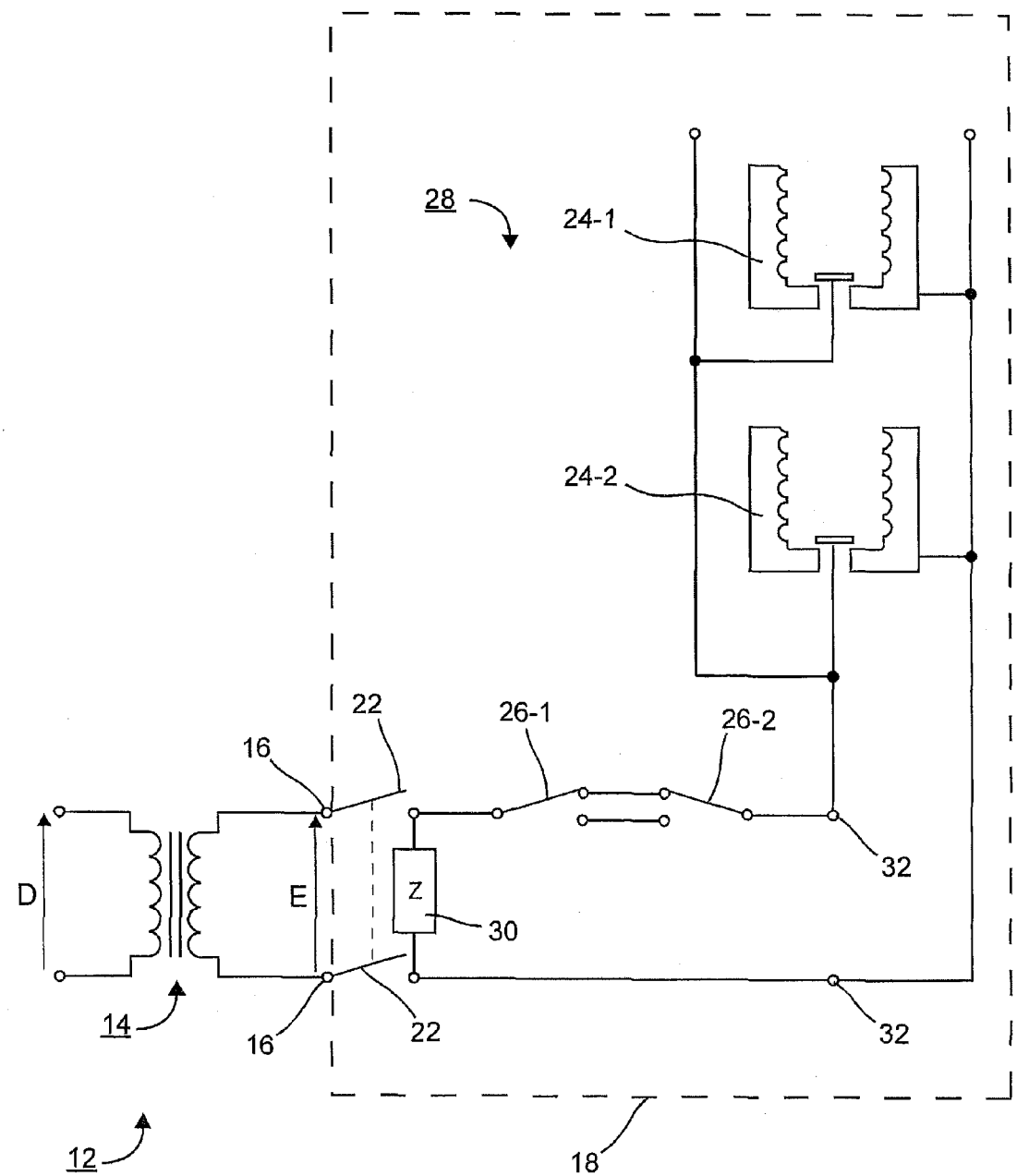
FIG. 2a is a schematic diagram illustrating the connection of the lighting device shown in FIG. 1 in a conventional wiring installation.

FIG. 2a is a schematic diagram illustrating a conventional electrical installation 12 in which the lighting device shown in FIG. 1 may be installed. As illustrated in FIG. 2a, local or national grid supplied AC power is typically transformed down from a very high transmission potential D, usually in the order of thousands of volts, to a lower "mains" supply voltage by a transformer 14. The secondary winding of the transformer 14 will provide power to one or more local consumers across terminals 16, here representing the external connections into a building 18. This input supply (shown as potential E) usually passes through one or more appropriate current limiting protection devices 22 (fuses, circuit breakers etc.) which are typically mounted within a distribution board, consumer unit or the like. As shown in FIG. 2a, two lamp holders 24-1 and 24-2 are connected within a lighting circuit 28 to the current limiting devices 22 via user operable isolating switches 26-1 and 26-2. In this illustration, the switches 26 are shown in a two-way configuration, although there may only be a single switch 26 or multiple switches connecting the holders 24 to the current limiting devices 22. Thus, lighting devices 1 mounted in such lamp holders 24 will have a mains power supply as the primary power supply for illuminating the light sources 7.

As shown in FIG. 2a, the impedance within the building 18 between the supply terminals is represented by the impedance (Z) 30. This impedance 30 is created by loads such as other electrical appliances and other devices that are connected to the incoming power supply at terminals 16, via the current limiting protection devices 22. As will be described in more detail later, it is this impedance 30 (optionally together with the impedance of the current protection devices 22 and the impedance of the transformer 14) that creates a useful detectable difference in impedance of the lighting circuit 28 when the user operable isolating switches 26 are in the open and closed states.

Thus when mains power is removed from a lighting device 1 mounted in one of the lamp holders 24 of lighting circuit 28, the lighting device 1 can detect if the switches 26 are open circuit or closed circuit by measuring the impedance across its primary supply terminals 32 and thus determine if the mains power has been removed by a power failure or by a user switching one of the isolating switches 26. Various different approaches can be taken in order to measure this impedance and hence to determine the positions of the manually operable switches 26. As will be explained in more detail below, the approach taken should ensure that measurements taken by one lighting device 1 do not interfere or detrimentally affect the operation of another lighting device mounted in the same lighting circuit 28 and controlled by the same switches 26 or on the same supply circuit as potential E. The preferred way in which this is achieved is described in more detail later.

A problem with mounting the lighting device in a conventional lighting circuit such as that shown in FIG. 2a is that the device 1 may not meet some emergency lighting regulations which typically mandate that an emergency light should come on in the event of a primary power supply failure and that battery charging should commence immediately following restoration of the failed mains primary power supply. In particular, if one of the isolating switches 26 is in the off (open circuit) position, then the lighting device 1 cannot detect the primary power failure and the battery 17 cannot be recharged when primary power is restored (as the lighting device 1 is isolated from the primary power supply by the open circuit switch 26).

Permanent Live Lighting Circuit

Figure 2B:
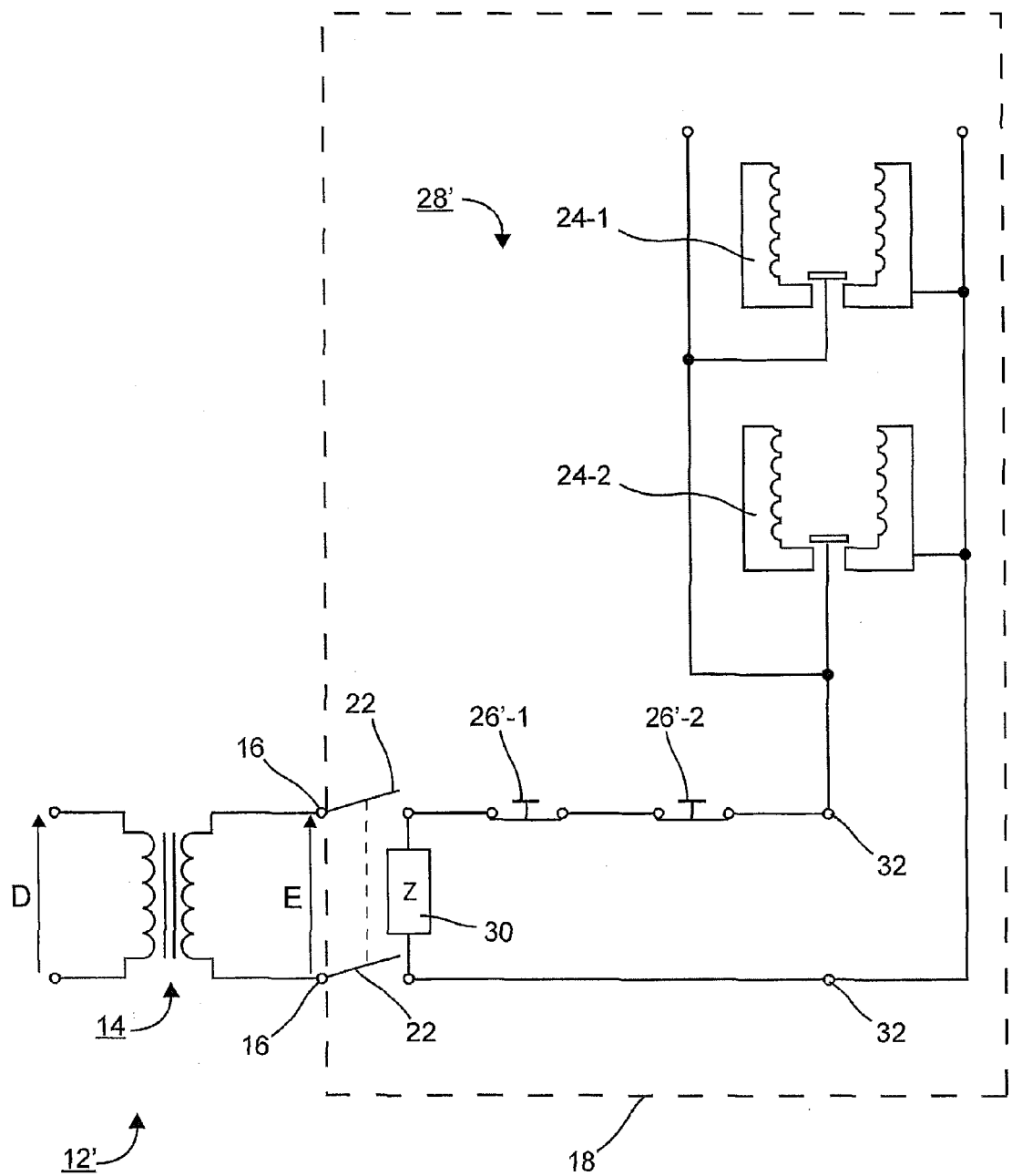
FIG. 2b is a schematic diagram illustrating the connection of the lighting device shown in FIG. 1 in a wiring installation that uses push-to-break user switches.

FIG. 2b is a schematic diagram illustrating an alternative electrical installation 12' in which the lighting device shown in FIG. 1 may be installed. As can be seen by comparing FIG. 2a and FIG. 2b, the lighting circuit 28' of FIG. 2b is the same as that shown in FIG. 2a, except that lighting devices 1 mounted in the lamp holders 24 will be permanently connected (or at least substantially permanently connected) to the primary supply; and that non-isolating switches 26' are provided that momentarily or temporarily break or otherwise change the connection between the lighting device 1 and the primary power supply (i.e. normally closed contacts). In this illustration, the switches 26' are push-to-break type switches that break the power supply to the lighting device 1 for as long as a user presses the switch 26'. Once the user releases the switch 26', the primary power supply will be connected again to the lighting device 1. The electronic circuitry 19 in the lighting device 1 can detect the temporary break and control the operation of the lighting device 1 accordingly. For example, if the lighting device 1 is currently on, and the electronic circuitry 19 detects a break in the primary power supply, then the electronic circuitry can switch off the lighting device 1. The electronic circuitry is able to determine if the break in the primary power supply has been caused by one of the switches 26' being activated (in which case the lighting circuit 28' will have a high impedance—caused by the open circuit of the activated switch 26'); or by a primary power supply failure (in which case the lighting circuit 28' will have a low impedance). If the break is caused by a power failure, then the lighting device 1 can turn on (using power from the internal battery 17) and provide emergency lighting. Once primary power is restored, the lighting device 1 can start to charge the internal battery 17 if or as required.

Thus when installed in the lighting circuit 28' shown in FIG. 2b, the lighting device 1 can meet the functional requirements of the above described emergency lighting regulations.

Operating Modes

The lighting device 1 used in this embodiment operates differently depending on whether it is connected in a conventional lighting circuit 28 like that shown in FIG. 2a or in the permanent primary supply lighting circuit 28' shown in FIG. 2b. The lighting device 1 can be configured by the installer to work in the correct manner depending on the type of lighting circuit in which it is being installed or factory set upon manufacture. Alternatively, the lighting device 1 can automatically deduce the type of lighting circuit (and switch type therein) in to which it has been installed. A simpler device may be designed to operate in only one type of lighting circuit. Additionally, in either type of installation, the lighting device 1 has a number of different modes of operation and the current mode of operation is typically determined based on external conditions of the primary power supply to the lighting device 1 and on the status of the user switches 26/26'. From the discussion above, the supply itself may be categorised into three states: power present, power not present when the supply is open circuit (high impedance), and power not present when the supply is closed circuit (low impedance).

Primary Mode of Operation

The primary mode of operation is defined to occur when there is a primary power supply electrically connected to the fitting 5 that can provide electrical energy to illuminate the light source(s) 7 and thereby produce useful light. When the lighting device 1 is connected in a conventional lighting circuit 28 (like that shown in FIG. 2a), the lighting device 1 is configured to illuminate the light sources 7 whenever primary power is available. However, as will become clear from the description given below, when the lighting device 1 is connected in a permanent live lighting circuit 28' (like that shown in FIG. 2b), the lighting device 1 is configured to control application of power received from the primary power supply to the light sources 7, depending on the previous illumination status of the lighting device 1 and on detected activation of the user switches 26'—thus presence of primary power at the lighting device 1 is not sufficient to cause the lighting device to turn on.

During this primary mode, the battery 17 may also be intelligently (re)charged as required using energy from the primary power supply, typically via a step-down transformer, switched mode power supply or other voltage reducing and rectifying subsystem. The charging of the battery 17 is controlled by the electronic circuitry 19 which monitors the charge rate and cell voltage to prevent overcharging or over rapid-charging.

During the primary mode of operation, electrical power is being provided by the primary power supply and therefore, there is no power failure. Accordingly, it is not necessary for the electronic circuitry 19 to sense the impedance of the supply lines to determine if any user operable switches are opened or closed. Therefore, the sensing can be inhibited or results negated or ignored for all or most of the time that the lighting device 1 is in this primary mode of operation. However, such sensing is performed as soon as a break in the primary power supply is detected—which may happen as a result of a power cut or the user opening one of the isolating switches 26 or one of the push-to-break switches 26'.

Secondary Mode of Operation

During the secondary mode of operation, the lighting device 1 is configured to produce useful light using power from a secondary power supply (in this case from the battery 17). The lighting device 1 is set into this mode for the duration that the lighting device 1 is connected to the primary power supply via the fitting 5 and there is an absence of primary power and the processing electronics 19 determines that there is a low impedance (typically below 5 k ohms) between the supply lines. The measurement of the supply impedance may be made continuously, periodically, randomly or pseudo randomly. Such random or pseudo random measurement may also help to avoid interference with other similar lighting devices 1 connected in the same lighting circuit (for example multiple lights controlled by a common light switch, such as a chandelier). The way that multiple lighting devices 1 can operate together will be described in more detail later.

In this preferred embodiment, the processing electronics 19 are arranged so that if the lighting device 1 is connected electrically via fitting 5 to a low impedance load, the lighting device is arranged to enter this secondary mode of operation and therefore to cause the lighting device 1 to generate light using power from the battery 17. This allows the lighting device 1 to be tested for demonstration, diagnostic or other purposes—for example by shorting the supply terminals on the fitting 5 with a suitable low impedance electrical connection (such as a user's hand). The processing electronics 19 can also set the lighting device 1 into its secondary mode of operation during diagnostic testing or in response to an input command received, for example, from an external device or signal sent via user operable switches 26 or 26'.

Dormant Mode of Operation

The dormant mode of operation is applicable to the situation when the lighting device 1 is connected in a conventional lighting circuit shown in FIG. 2a. In the dormant mode of operation, the lighting device 1 is configured to emit no useful light, although the electronic circuitry 19 is partially active. The lighting device 1 is configured to enter the dormant mode of operation for the duration that there is no primary power input via the fitting 5 when the lighting device 1 is connected to a lighting circuit 28 and when there is a high impedance load connected to the primary power supply lines (typically above 10 k ohms). Again, the measurement of this impedance may be made continuously, periodically, randomly or pseudo randomly. The lighting device 1 exits the dormant mode when mains power is restored across the primary power supply terminals (in which case it returns to the primary mode of operation discussed above) or if the sensing circuitry senses a low impedance load connected to the primary power supply lines whilst there is still no primary power supply (in which case it returns to the secondary mode discussed above).

In this preferred embodiment, the electronic circuitry 19 employs various energy saving techniques and circuit components that minimise the power drawn by the electronic circuitry 19 from the battery 17 during the dormant mode of operation.

Sleep Mode of Operation

In the sleep mode of operation, the lighting device 1 is configured to emit no useful illumination and the electronic circuitry 19 is arranged to make no impedance measurements. The sleep mode of operation may be entered after the lighting device 1 has been in the dormant mode of operation for a predetermined period of time (for example six months), or should the battery charge fall below a low threshold level, or when it is signalled to do so by an external device or by the user applying certain predefined conditions on the lighting device 1—such as by switching primary power to the lighting device 1 six times in a three second period. Detection of the mains signal may be made, for example, by detecting that the signal received at the primary supply terminals has a frequency within an expected frequency range (for example between 40 Hz and 70 Hz). The lighting device 1 is preferably set into its sleep mode as the default condition when it is manufactured, such that there remains no or minimal drain on the battery 17 until the product is installed by the user. The lighting device 1 may be "woken" from the sleep state by, for example, applying primary power to the lighting device 1.

When the primary supply is removed from the lighting device 1, the lighting device 1 instantly switches to secondary mode (light on) whilst it measures external conditions. This ensures that there is no flicker or interruption to illumination during normal use or during a power failure.

Diagnostic and Mode Indicators

In this embodiment, the lighting device 1 has a diagnostic indicator 23 in the form of a light emitting diode that is connected separately to the electronic circuitry 19. The electronic circuitry 19 can control the diagnostic indictor 23 to either continuously or intermittently indicate the current operating mode and/or to indicate any fault detection therein. This may be achieved, for example, by varying the illumination of the diagnostic indicator 23 or, if multiple different LEDs are provided with different colours, these can be illuminated to indicate different diagnostic states. Optionally such a diagnostic system could include a parameter associated with battery condition or status.

Remote Control

As shown in FIG. 1, the preferred lighting device 1 also includes a communication transducer 25 that can receive signals from and transmit signals to another device (not shown) that is remote from the lighting device 1. These external signals may be used, for example, to control the operation of the lighting device 1, if diagnostic testing or configuration by a remote operator is desired. The communication transducer 25 may be, for example, an optical transducer (such as an infra-red transducer) or an acoustic or an electromagnetic transducer (such as an RF transceiver) which can communicate with the remote device using corresponding wireless signals. The remote device can be a simple battery or otherwise powered hand held controller having a number of functional buttons (or the like) for allowing a user to input control commands to the lighting device 1. The remote controller may also be used to configure the lighting device 1 to identify if it has been installed in a conventional lighting circuit 28 like that shown in FIG. 2a or in a lighting circuit 28' with a permanent primary power supply like that shown in FIG. 2b, which information controls the way in which the electronic circuitry 19 responds to different external conditions.

This remote control feature may be used, for example, to vary the brightness of the light generated by the lighting device 1. This can be achieved, for example, by varying the power (current and/or voltage) applied to the light source(s) 7. Alternatively, if the light source(s) 7 are arranged in different groups, with the light source(s) 7 in each group being independently powered by the electronic circuitry 19, then the brightness can be varied by varying the number of light source(s) 7 that are simultaneously powered.

The communication transducer 25 can also be used to communicate the status and/or diagnostic information to the remote device. For example, the electronic circuitry 19 may be arranged to monitor the charge status of the battery 17 and this remaining charge status may be signalled to the remote device via the communication transducer 25.

The communication transducer 25 can also be used to receive user programming information input via an external device for storage within a memory of the electronic circuitry 19. This user programming could define, for example, emitter brightness in primary and/or in secondary modes of operation or the frequency or manner in which self-diagnostic tests and results are performed and signalled to the user such as via the diagnostic indicator 23. The remote control signal can also be used to turn on the lighting device 1 even when there is no power failure or when the user operable switches 26 are open circuit. This function could be used, for example, in a building scenario where a central control station instructs a plurality of lighting devices 1 within the building to switch on at a defined level of illumination for night time illumination purposes.

Electronic Circuitry

FIG. 3 is a block diagram illustrating the main components of the electronic circuitry 19 used in this preferred embodiment. As shown, the circuitry 19 includes a power supply unit 31 that is connected to primary supply terminals 33 provided in the fitting 5, for connection to the mains supply; and secondary supply terminals 34 for connection to the positive and negative terminals of the battery 17. The power supply unit 31 is configured to transform the primary supply voltage, for example by step-down transformer, switch mode power supply or other voltage reducing and rectifying subsystem; and to provide power derived from the primary supply (or if it senses that there is no primary supply at the supply terminals 33, to supply power from the battery 17 via terminals 34) to a processor 35 that controls the operation of the lighting device 1. The power supply unit 31 also provides the power required for illuminating the light source 7.

The electronic circuitry 19 also includes a latching module 36 that maintains previous state information for the lighting device 1 and a timer 38. In this embodiment, the latching module 36 and the timer 38 are used when the lighting device 1 is connected to a lighting circuit 28' that has a permanent (or virtually permanent) primary power supply. The processor 35 determines whether or not to use power received at the primary power supply terminals 33 to illuminate the light sources 7 based on whether or not primary power is available at the primary power supply terminals 33 and depending on the state information maintained in the latching module 36. The timer 38 is used to measure the time that a user activates one of the switches 26', which can be used to ensure correct operation and to control dimming or other functions of the lighting device as shall be described later.

The electronic circuitry 19 also includes sensing circuitry 37 which is configured to sense the impedance across the primary supply terminals 33; a charging circuit 39 for charging the battery 17 via the terminals 34 or other connections; a diagnostic module 41 for performing the various diagnostic testing discussed above and for controlling the diagnostic indicator 23 via one or more terminals 43; and a communications module 45 for communicating with remote devices via the communication transducer 25 connected via one or more terminals 47.

As shown in FIG. 3, in this embodiment, the electronic circuitry 19 also includes two output drivers 50-1 and 50-2 that are controlled by the processor 35 and that provide the desired drive currents for driving the light sources 7 (not shown) via output terminals 49 and 51. In this embodiment, the light sources 7 are arranged in two groups, with the light sources 7 in each group being driven by a respective one of the output drivers 50. Thus, in this embodiment, the processor 35 can switch on the light sources 7 in both groups at the same time or the light sources 7 in either one of the groups by controlling the respective output driver circuits 50. The processor 35 can also vary the brightness of the light sources 7 in each group by setting a desired drive power for each output driver circuit 50. Multiple output drivers 50 can be used and controlled in this way by control circuitry 19.

In the block diagram illustrated in FIG. 3, the different modules are shown as being separate modules from the processor 35. In practice, the functionality of many of the modules shown in FIG. 3 will be software modules run by the processor 35 or a mix of software and hardware. For example, the latching module 36 may take the form of some processor code and some memory; or it may be formed using one or more hardware latches that toggle their output based on a change of operating state of the electronic circuitry 19 or sub-systems thereof. The modules have been illustrated in the form shown in FIG. 3 for ease of understanding the functions and operation of the different modules. A more detailed description of the various modules will now be given.

Processor

In this embodiment, the processor 35 is at the heart of the electronic circuitry 19 and controls the operation of all of the modules shown in FIG. 3. The processor 35 may be based on an ASIC device but is preferably a programmable processor (such as a PIC microcontroller) having memory and software that defines its operation. Such software controlled processors are easier to update with improved software or additional functionality after installation. During the primary mode of operation, the processor 35 is powered from a voltage derived from the primary supply; and in the secondary and dormant modes of operation it is powered by a voltage derived from the battery 17.

Charging Circuit

The charging circuit 39 is provided to monitor the charge status of the battery 17 (via the power supply unit 31) and to charge (or recharge) the battery 17 when needed. By monitoring the charge status of the battery 17, the charging circuit 39 can ensure that the battery 17 is not overcharged. The charging circuit 39 can also signal the present battery charge status to the diagnostic module 41 for historical recording and analysis (such as to adjust brightness levels during secondary mode operation to achieve a given minimum illumination duration e.g. 3 hours) and/or for output to the user either via the diagnostic indicator 23 or via the communication transducer 25. In this embodiment, the charging circuit 39 also limits battery usage in the secondary mode of operation, so that the battery charge is not completely exhausted, otherwise resulting in potential battery damage. Therefore, in this embodiment, the charging circuit signals the processor 35 to stop emergency illumination when the battery charge falls below a defined lower threshold level.

Diagnostic Module

The diagnostic module 41 performs various diagnostic tests and presents the diagnostic results to the user via the diagnostic indicator 23. The diagnostic results can also be stored within a memory (not shown) of the processor 35 to maintain an historical record of the operation of the lighting device 1. The diagnostic module 41 may interact with the charging circuit 39 in order to obtain battery charge status information and with the sensing circuitry 37, the communication module 45 and the output drivers 50 to confirm correct operation thereof. The operation of the diagnostic module 41 can be controlled by the user either via signals received using the communication transducer 25 or other signals communicated, for example, over the primary supply via terminals 33.

Communications Module

The communications module 45 is operable to control communication between the lighting device 1 and an external device via the communication transducer 25. The communications module 45 is responsible for performing any required modulation and demodulation of the data to be transmitted to and received from the remote device. For example, the communications module 45 may transmit diagnostic data obtained from the diagnostic module 41 to a remote device for remote monitoring of the operation of the lighting device 1. Alternatively, user configuration data may be received from the remote device and programmed into the processor 35.

Output Driver

The output drivers 50 are controlled by the processor 35 and generate the driving currents (or voltages) required to drive the light sources 7. The output driver 50 used will depend on the technology and configuration of the light source(s) 7 being driven. In this embodiment, the light sources 7 are LEDs and the output drivers 50 can be commercially available integrated circuit LED drivers having features such as efficient Pulse Width Modulation (PWM) current feedback driving of the LEDs, whether individually or in one or more "strings". Each output driver 50 is controlled (independently or as a single entity) by the processor 35 and can generate a respective different drive current (or voltage) at its output terminals 49/51. The output drivers 50 obtain their power for generating the drive signals from supply voltages generated by the power supply unit 31.

Sensing Circuitry and Power Supply Unit

As shown in FIG. 3, the sensing circuitry 37 is configured to sense the impedance across the primary supply terminals 33 via the power supply unit 31. The way in which this connection is made and the way in which the sensing circuitry 37 performs the measurement, in this preferred embodiment, will be explained later with reference to FIG. 5.

Latching Module

As discussed above, the latching module 36 maintains state information for the lighting device 1 to allow correct operation of the lighting device 1, when connected to a lighting circuit 28' that provides a virtually permanent primary power connection to the lighting device 1. In particular, as shown in FIG. 2b, the lighting device 1 will receive primary power except when the user activates one of the switches 26' and/or when there is a power failure. Thus, when the lighting device 1 detects that the user has pressed one of the switches 26' (causing removal of primary power), it remembers the present operating state to know what to do. In particular, if the lighting device 1 is using power from the primary power supply to illuminate the light sources 7 when it detects that the user has pressed one of the switches 26', then after the user releases the switch 26' (indicated by the return of primary power at supply terminals 33) the lighting device 1 will turn off (or otherwise change) power to the light sources 7. However, if the light sources 7 were off just before the user pressed the switch 26', then the lighting device 1 will turn on the light sources 7 after the user releases the switch 26' upon re-application of primary power. The latching module 36 maintains the present operating state information to allow the lighting device 1 to take the correct control action. As will be described in more detail below, in this embodiment, the processor 35 sends the latching module 36 a control signal whenever it is to change its latched state and the control action taken by the processor in response to a change in the external operating conditions of the lighting circuit 28' depends on the latched output from the latching module 36.

Operation with Permanent Primary Supply

A more detailed description will now be given of the way in which the electronic circuitry 19 can operate when the lighting device 1 is connected to the lighting circuit 28' shown in FIG. 2b that provides a virtually permanent primary power supply to the lighting device 1.

In the following description the following operating conditions will be considered and distinguished:

Condition A—primary power supply present at primary supply terminals 33;

Condition B—primary power supply not present at supply terminals 33 and high impedance measured across primary power supply terminals 33 (indicative of one of the switches 26' being open circuit); and Condition C—primary power supply not present at supply terminals 33 and low impedance measured across primary power supply terminals 33 (indicative of switches 26' being closed and therefore primary power supply failure).

FIG. 4a is a diagram illustrating graphically and over time the way in which the lighting device 1 operates normally when there is no primary power supply failure. The upper plot 53-1 shown in FIG. 4a illustrates graphically that initially the external operating condition is condition A—that is the lighting device 1 is receiving primary power at the primary supply terminals 33. The lower plot 53-2 illustrates the output from the latching module 36. In a simple embodiment the processor 35 uses the output from latching module 36 to control the switching on and off of the light sources 7. When it has a "0" or logic low output the processor 35 switches off the light sources 7; and when it has a "1" or logic high output the processor 35 switches on the light sources 7 using power from the primary power supply connection 33. Thus in the example illustrated in FIG. 4a, initially the output from the latching module 36 is "0" and therefore the light sources 7 are not illuminated.

At some subsequent time t1, the user presses one of the switches 26', which removes power from the primary power supply terminals 33 (condition B) and this is detected by the electronic circuitry 19. (When primary power is removed from the lighting device 1, the components of the electronic circuitry 19 are powered by the battery 17.) The removal of the primary power supply may be detected, for example, by detecting when a rectified signal level at an output of the power supply unit 31 (obtained by rectifying the signal received at the primary supply terminals 33) falls below a threshold level. In response to detecting the removal of the primary power supply, the timer 38 is started and the sensing circuitry 37 starts to make measurements of the impedance across the primary supply terminals 33. In this case, as the switch 26' has been pressed by a user, the impedance will be high—confirming that the user has activated the switch 26' and therefore wants to change the operating state of the lighting device 1. Preferably a number of measurements are taken before a decision is taken on what to do—to reduce the risk of the wrong control action being taken.

In order to avoid changes to the operating state caused by short glitches to the primary power supply, the primary power supply must be removed from the primary supply terminals 33 for a minimum period of time before the processor 35 will make any change in operating state of the lighting device 1. In this embodiment, the minimum period of time is one tenth of a second, although other minimum periods could of course be used. As illustrated in FIG. 4a, in this example, the operating condition remains in condition B for duration ta, which is greater than one tenth of a second. Therefore, when the user releases the switch 26' at the end of the period ta, the primary power supply is reinstated across the primary power supply terminals 33 and this will be detected by the electronic circuitry 19. This may be detected by determining when the above rectified signal level at the output of the power supply unit 31 (obtained by rectifying the signal received at the primary supply terminals 33) is greater than another threshold level. When the electronic circuitry 19 detects that the primary power supply has been reinstated, the processor 35 stops the timer 38 and reads out (or otherwise deduces) from the timer 38 how long the user pressed the switch 26' (i.e. time period ta) and determines if it is greater than the above described minimum period of time. In this case it is greater than this minimum time period and so the processor 35 sends a control signal to the latching module 36 to change its output state. In this case as the present output state of the latching module 36 is a "0", the output state of the latching module 36 is toggled to a "1". The processor 35 responds to this changed output state by controlling the output driver circuits 50 to cause them to illuminate the light sources 7 using power derived from the primary power supply received at the primary power supply terminals 33. The latching module 36 maintains this output state until the next change in external conditions is detected.

FIG. 4a also shows, at time t2, a short change of external operating conditions—from condition A to condition B that lasts for duration tb, which is less than one tenth of a second. As shown, in this case, the processor 35 will determine that the time tb is less than the above defined minimum time period and so it ignores the change and does not send a control signal to the latching module 36 to change its output state. Accordingly there will be no change in the illumination of the light sources 7 caused by the change in external conditions at time t2.

At time t3, the external operating conditions again change from condition A to condition B (primary power being present to no primary power being present and when the switch is in the high impedance open state) and remains in this condition for a duration, tc, which is again longer than the minimum threshold—one tenth of a second. Therefore, when the user releases the switch 26' and primary power is restored, the processor 35 causes the latching module 36 to change or toggle its output state. As the present output state of the latching module 36 is a "1", the output state is changed to a "0". The processor 35 responds to this new output state and controls the output driver circuits 50 in order to inhibit these drivers from providing power to the light sources 7, thereby switching off the light sources 7.

In this embodiment, when the light sources 7 are illuminated and the primary power supply is removed (such as at times t2 and t3), the processor 35 initially causes the output driver circuits 50 to provide power to the light sources 7 using secondary power from the battery 17 until a decision is made as to whether or not the light sources 7 are to be switched off. In this way, the light sources 7 will not flicker when there are glitches on the primary power supply.

The above description illustrated the basic operation of the lighting device 1 when there is no primary power supply failure. FIG. 4b illustrates graphically two possible operations of the lighting device 1 when there is a primary power failure of the mains supply (condition C mentioned above). In particular, the upper plot 54-1 illustrates graphically the changing external operating conditions; the middle plot 54-2 illustrates one way in which the lighting device 1 can be programmed to respond to a power failure; and the lower plot 54-3 illustrates another way in which the lighting device 1 can be programmed to respond to the power failure. In the first way of responding, illustrated by the middle plot 54-2, the lighting device 1 ignores the power failure and continues operating in the manner discussed above. Therefore, when there is a power failure at time t4, the processor 35 does not send the latching module 36 a control signal to change the output state of the latching module 36 and so the lighting device 1 maintains its present operating mode—in this example the light sources 7 remain off. When the user subsequently presses one of the switches 26' at time t5 (for more than the above described minimum period of time), the electronic circuitry 19 detects this and in response, the processor 35 sends a control signal to the latching module 36 to change its output state—in this case from a "0" to a "1". The processor 35 responds to this change in latching module output state and causes the light sources 7 to be illuminated using power from the battery 17 (as there is no primary power supply at this time). When the user presses the switch 26' again at time t6, the electronic circuitry 19 detects this and the processor 35 sends another control signal to the latching module 36 causing it to change its output state—this time from a "1" to a "0". The processor 35 responds to this change in latching module 36 output state and causes the light sources 7 to be turned off again. In this manner, the light produced by light sources 7 within lighting device 1 may be controlled even during such time that a power supply failure has occurred. The lights sources 7 remain off even when the primary power is restored to the lighting circuit 28' at time t7.

In the other way of responding (illustrated in the lower plot 54-3 of FIG. 4b), the lighting device 1 operates more like a conventional emergency lighting device. In particular, at time t4 when there is a primary power failure, the electronic circuitry 19 detects this (by sensing the absence of the primary power supply signal and measuring a low impedance across the supply terminals 33). The processor 35 then reads the present output state of the latching module 36. If it is a "0" (indicating that the light sources 7 are currently off) then the processor 35 sends a control signal to the latching module 36 to cause it to change its output state from a "0" to a "1" (which will cause the processor 35 to illuminate the light sources 7 using power from the battery 17). However, if the latching module 36 output state is already a "1" (indicating that the light sources 7 are already illuminated) then the processor 35 does not send the latching module 36 a control signal to change its output state (and the lights sources 7 will continue to be powered except now using power from the battery 17). Thus if the light sources 7 were originally off and they suddenly come on, then this informs the occupants of the building of the power supply failure. This manner of operation also meets some of the typical regulatory requirements that specify that emergency lights must illuminate in the event of a power failure (if they are not already illuminated using the primary power supply).

Subsequently, if a user then momentarily presses (for longer than the above minimum time period) one of the switches 26' at time t5, the electronic circuitry 19 detects this by sensing the high impedance across the primary supply terminals 33 whilst the switch 26 is pressed and therefore open circuit. In response, the processor 35 sends a control signal to the latching module 36 to cause it to change its output state. As the present state is a "1", this control signal causes the latching module 36 to toggle its output to a "0". In response, the processor 35 causes the light sources 7 to be switched off. If the user again momentarily presses (for longer than the above minimum time period) the switch 26' at time t6, then this will be likewise detected and will hence cause the processor 35 to send a control signal to the latching module 36 to cause it to toggle its output state—this time from a "0" to a "1". The processor 35 responds to the new output state of the latching module 36 by causing the light sources 7 to be illuminated once more using power from the battery 17. When primary power is restored to the lighting circuit 28' at time t7, the electronic circuitry 19 once again senses this change in external conditions. In response, the processor 35 checks the present output state of the latching module 36. If it is a "1", then the processor 35 sends the latching module 36 a control signal to change its output state to a "0". If the present output state of the latching module 36 is already a "0" then the processor 35 does not send a control signal to the latching module 36 and the output state remains the same. In either case, the output state will be a "0" and the processor 35 will respond by switching off the light sources 57. In this way, in this mode of operation, the lighting device 1 behaves like a conventional emergency lighting device, except that the user is able to switch off the emergency lighting if it is not needed simply by operating the switch 26'. Also once the primary power supply is reinstated, the charging circuit 39 can immediately start to recharge the battery 17, again meeting the strictest of regulatory requirements.

As a further alternative operating mode, the processor 35 may ignore user operation of the light switches 26' when there is a power failure and in this way the lighting device will operate in the same way as a conventional emergency light. Further still, an additional mode can be included and optionally user enabled wherein if the latching module 36 was in a "1" state prior to the power failure, it continues in this state (e.g. this information is stored or otherwise remembered by another latch or memory) upon reinstatement of the primary power supply, further optionally unless any operation of the user operable switches 26' has been detected during the power failure event. The way in which the lighting device 1 will respond to the different external operating conditions may be fixed for a given lighting device 1 or it may be user configurable during a configuration routine.

Dimming

In addition to merely switching on and off the light sources 7, the user activation of the switches 26' may also be used to allow the user to set the brightness level of the light sources 7. Thus a user may be able to effect dimming of the light sources 7 via the switches 26' and the control circuit 19 without any other hardware being added to the system, even during a power failure. The way in which this can be achieved will now be described.

FIG. 4c illustrates graphically the way in which this dimming control can be achieved by the user holding the switch 26' for varying durations of time and with the brightness changing based on that duration. Thus, the upper plot 55-1 in FIG. 4c illustrates a change in external conditions from condition A (primary power present and switches closed) to condition B (switches open and hence primary power, if available, not present). This is also applicable when there is a change in conditions from condition C to condition B. Thus at time t8, there is a change of condition from condition A (or C) to condition B—in other words the user presses one of the switches 26'. The processor 35 detects this in the manner discussed above and starts the timer 38. In this case, if the user keeps holding the switch 26' until the timer 38 exceeds a preconfigured "dimming threshold" that is longer than the user would normally activate the switch 26' when operating in the conventional "on"/"off" mode discussed above, a dimming cycle or mode may be entered. The dimming threshold may be, for example, one or two seconds. In the illustration shown in plot 55-1, the processor 35 detects that the timer 38 has reached this dimming threshold at time t9. In response, the processor 35 enters a dimming mode in which it checks the output of the latching module 36. In this case the latching module 36 is not a simple binary toggle latch, but acts more like a counter that can count from "0" to "MAX" and from "MAX" to "0". When the latching module 36 has a "0" output, the light sources 7 are off and when it has a "MAX" output, the lights sources 7 are on with maximum (user defined) brightness. Intermediate output values of the latching module 36 correspond to intermediate brightness levels of the light sources 7.

Thus in the illustration shown in FIG. 4c, the latching module 36 initially has an output value of "0". At time t9, the processor 35 determines that the user has activated one of the switches 26' for longer than the dimming threshold and sends a control signal to the latching module 36 to set the output to its "MAX" output value since it was previously "0". Therefore, at time t9 the light sources 7 are turned on to maximum brightness. The user continues to hold the switch 26' until time t10 at which point the switch 26' is released. Between times t9 and t10, the processor 35 sends a control signal to the latching device 36 at a regular interval or otherwise in order to reduce the output value maintained by the latching module 36. Therefore, as shown in plot 55-2, between times t9 and t10, the latching module's output will decrease. As discussed above, the processor 35 is responsive to the output state of the latching device 36 to control the power delivered to the light sources 7. Thus between times t9 and t10 the brightness of the light sources 7 will reduce steadily until the user releases the switch at time t10, after which it maintains that level of brightness until the next switching or power failure event. Therefore, the brightness of the light sources is determined by the length of time that the user activates the switch 26'.

If the user subsequently presses the switch 26' again at time t11, then the electronic circuitry 19 detects this and after the above described dimming threshold (i.e. at time t12) the processor 35 starts sending control signals again to the latching module 36 to reduce its output level (starting from the output level previously set at time t10), thereby reducing further the brightness of the light sources 7. Once the output of the latching module reaches "0" again at time t13 (or some other defined minimum brightness level above zero or "off"), the control signals received from the processor 35 cause the latching module 36 to start increasing its output value until time t14, when the user releases the switch 26'. The brightness of the light sources 7 can therefore be made to cycle between maximum and minimum values until the user releases the switch 26'. Of course, if the user activates the switch 26' for a shorter period of time at time t11 (shorter than the dimming threshold but longer than the minimum time) then the latching device 36 would toggle its output value from whatever value it was at to "0", thereby causing the processor to switch off the light sources 7. The next dimming operation may commence at the same preset or memorised brightness level as has been previously set, or optionally set to the same maximum or otherwise repeatable brightness level, further optionally after a given threshold for time duration or number of dimming mode operation transitions has been exceeded.

Therefore, as can be seen from the above discussion, the user can control the brightness of the light sources 7 simply by varying the length of time that they activate the switch 26'.

As those skilled in the art will appreciate, whilst the user is pressing the switch 26' the light sources 7 will be powered by the battery 17 and therefore, the action of dimming also serves as a check that the battery 17 has sufficient charge and tests that the lighting device is operating as it should. Once the user releases the switch 26', the same power level can be supplied to the light sources 7 using power derived from the primary power supply, if it is available.

In addition to allowing the user to control the dimming of the light sources 7 during normal use, this technique to control dimming can also be used to set the brightness of the light sources 7 during the "primary" and "secondary" operating modes discussed above. Thus the user may set different brightness levels depending on whether or not primary power is available. The processor 35 can store these brightness levels for future use, such that when the light sources 7 are turned on the processor can set them at the previously set brightness level, which may be different for "primary" and "secondary" modes of operation.

Impedance Sensing

As shown in FIG. 5, the sensing circuitry 37 is connected to the primary supply terminals 33 via isolating resistors 61 and 63, which prevent the primary supply from damaging the sensing circuitry 37. When the sensing circuitry 37 wishes to make a measurement of the impedance across the supply terminals 33, the sensing circuitry 37 applies a measurement voltage across the supply terminals 33, which may be referenced to or isolated from the ground potential. The magnitude of this measurement voltage is preferably between 1 and 9 volts and typically at a voltage level similar to that provided by the battery 17 (such as 3 volts). This is much smaller than the magnitude of the mains supply voltage which is an AC voltage having an RMS value typically between 88 volts and 265 volts. As will become apparent from the following description, therefore, when the mains supply voltage is present at the terminals 33, the sensing circuitry 37 is not able to use the measurement voltage to sense the impedance across the supply terminals 33. However, this is not important as there is no need for the electronic circuitry 19 to measure the impedance across the supply terminals 33 when the primary supply voltage is present. Indeed, in the preferred embodiment, the processor 35 inhibits the sensing circuitry 37 from generating the measurement voltage during the primary mode of operation, when the supply voltage is present across the terminals 33. The presence of the supply voltage may be detected, for example, by checking that the mains voltage level across the primary supply terminals 33 is within pre-defined limits of expected values of the voltage (or stepped-down or otherwise transformed voltage for reference purposes) or by checking that the frequency of the supply voltage is within expected values of frequency, for example, by checking that the primary supply voltage has a frequency above 40 Hz and below 70 Hz.

As shown in FIG. 5, the primary supply terminals 33 are connected to a bridge circuit 69 which converts the AC supply voltage into a DC voltage which is input to a switch mode power control module 71 via a zener diode 73. The switch mode power control module 71 then converts the input DC voltage into the appropriate output voltages required for powering the other components of the electronic circuitry 19 and for powering the light source(s) 7.

The reason for using the zener diode 73 will now be explained. As discussed above, the purpose of the sensing circuitry 37 is to sense the impedance across the primary supply terminals 33. However, the supply terminals 33 are connected both to the lighting circuitry 28 or 28' (shown in FIG. 2) and to the circuit components of the power supply unit 31 and the rest of the electronic circuitry 19. Therefore, if the power supply unit 31 and/or the other circuitry in the lighting device 1 provide a low impedance path between the supply terminals 33, then the sensing circuitry 37 may mistakenly interpret that user operable switches 26 or 26' in the lighting circuit 28 or 28' are closed (low impedance) when in fact they are open (high impedance). Therefore, in this embodiment, the zener diode 73 is used in order to provide isolation between the sensing circuitry 37 and the rest of the electronic circuitry 19. This isolation is achieved because the magnitude of the measurement voltage is less than the zener diode breakdown voltage and therefore the zener diode 73 provides a high impedance to the sensing circuitry 37 (or at least to the measurement voltage). Of course, when the primary voltage is applied across the supply terminals 33, the rectified DC voltage applied across the zener diode 73 is much larger and will be greater than the breakdown voltage of the zener diode 73. Therefore, when the primary supply voltage is present at the terminals 33, the rectified voltage from the bridge circuit 69 passes through the zener diode 73 to the switch mode power control module 71. Similar isolation can be achieved using other semiconductor junction devices—for example using a number of diodes connected in series such that the voltage drop across all of the diodes is greater than the measurement voltage, or if the measurement voltage is lowered below the breakdown voltage of a conventional diode, then the zener diode 73 may be replaced with a conventional diode.

As shown in FIG. 5, a capacitor 75 is connected across the primary supply terminals 33. This capacitor 75 is conventionally used to improve the performance of lighting devices in terms of EMC compliance and performance and the like (for example for performing smoothing as part of a PSU). In this preferred embodiment, however, the capacitor 75 is also used by the sensing circuitry 37 when determining the impedance between the supply terminals 33. In particular, the capacitor 75 offers a known circuit component for the sensing circuitry 37 to detect as a reference and allows for self-test verification of its sensing functionality.

Measurement Process

As mentioned above, when the sensing circuitry 37 performs a measurement, it applies a measurement voltage across the supply terminals 33. In this embodiment, to minimise the risk of interference between similar lighting devices 1 on the same lighting circuit and to minimise the energy drawn from the battery 17 when making the measurements, the sensing circuitry 37 generates a measurement signal 65 that comprises a sequence of voltage pulses 67 (which are illustrated here as being square wave pulses, but they could have different pulse shapes). During each voltage pulse 67, charge will be stored on the capacitor 75 which will then decay over time once the voltage pulse 67 has ended. The rate at which the charge on the capacitor 75 accumulates and then decays depends on the impedance across the supply terminals 33 and hence on the state of the user operable switches 26 or 26'.

FIG. 6 shows a number of graphical representations of the transmitted pulses 67 (FIG. 6a) and the corresponding charge (voltage) across the capacitor 75 that results (FIGS. 6b and 6c). FIG. 6a illustrates the voltage pulses generated by the sensing circuitry 37. The duration (T0) of each voltage pulse 67 is typically in the order of milliseconds and the period (T) between pulses is typically in the order of 0.1 to 10 seconds. FIG. 6b illustrates the way in which the voltage across the capacitor 75 accumulates and then decays over time when the manually operable switches 26 or 26' are in their open (high impedance) state; and FIG. 6c illustrates the way in which the voltage across the capacitor 75 accumulates and then decays over time when the manually operable switches 26 or 26' are in their closed (low impedance) state. As can be seen by comparing the plots shown in FIGS. 6b and 6c, the rate at which the voltage across the capacitor 75 accumulates and then decays depends on the impedance across the supply terminals 33 and hence in dependence upon the state of the manually operable switches 26 or 26'. Therefore, the sensing circuitry 37 can sense the present state of the manually operable switches 26 or 26' by monitoring the voltage across the capacitor 75. There are various ways in which the sensing circuitry 37 can perform this monitoring and some of these will now be discussed.

One technique for sensing the state of the switches 26 or 26' is illustrated in the left hand waveforms of FIGS. 6b and 6c respectively. In this technique, the sensing circuitry 37 measures the time taken for the decaying voltage to fall from point W1 (corresponding to a known voltage V1 across the capacitor 75) to a point W2 (corresponding to a known voltage V2 across the capacitor 75); and then compares the determined time (T1 in the case of the plot shown in FIG. 6b and T2 in the case of the plot shown in FIG. 6c) against a predetermined threshold. If the determined time is above the threshold, such as is the case for the plot shown in FIG. 6b, then the manually operable switches 26 or 26' are determined to be in the open state; whereas if the determined time is below the threshold, such as is the case for the plot shown in FIG. 6c, then it is determined that the manually operable switches 26 or 26' are in the closed state.

The predetermined threshold value that is used in the determination may be a factory set constant or it may be adapted depending on the installation in which the lighting device 1 is installed. For example, the sensing circuitry 37 may be arranged to sense the variation in impedances over a predefined period and detect the minimum value of measured time and the maximum value of measured time. The threshold value can then be set somewhere in the middle between these two times. Alternatively, during an installation procedure, the user may be requested to switch the manually operable switches 26 or 26' on and off a number of times (when the primary supply is isolated from the lighting circuit) so that measurements can be obtained when the switches or 26' are open and when they are closed. An appropriate threshold value can then be determined for the given installation. Since the impedance 30 within the building or on the lighting circuit 28 or 28' may change over time (such as by changes to the type and number of other lighting devices that may be installed on the same circuit 28 or 28'), the sensing circuitry 37 can keep a running average value for the high impedance measurements and a running average value for the low impedance measurements that it makes and then use these average values to re-set the threshold value from time to time.

The threshold potentials V1 and V2 used in this technique may also be factory set threshold values or they too may be dynamically set during a calibration routine for the lighting device 1 once it is installed in the lighting circuit 28 or 28' or otherwise selected by the user or mode of operation. The values are preferably chosen so as to yield a reliably wide spread in measured times between the open and closed states of the manually operable switches 26 or 26'.

An alternative measurement technique is illustrated in the right hand plots shown in FIGS. 6b and 6c. In particular, in this technique the sensing circuitry 37 is arranged to measure the time taken for the voltage across the capacitor 75 to fall from its measured maximum value (V3) at point W3 to a point W4 at which the potential has fallen to a value V4 which is a set fraction (for example one fifth) of the peak potential V3. Thus, as before, when there is a high impedance connected across the supply terminals 33 (when the switches 26 or 26' are open), the measured time, T3, will be greater than the threshold, and conversely, the measured time, T4, will be below the threshold when there is a low impedance across the supply terminals 33 (when the switches 26 or 26' are closed).

With either of the techniques described above, the sensing circuitry 37 preferably uses a window comparator, such as the window comparator 81 shown in FIG. 6d (which may be implemented in hardware and/or software). In this case, the input voltage Vin (which is the voltage across the capacitor 75) is input to two comparators 83-1 and 83-2. In comparator 83-1, the input voltage is compared with the high voltage reference value $V^H$ref (corresponding to the voltage V1 for the first technique or the measured maximum capacitor voltage V3 in the second technique) and in the other comparator 83-2, the input voltage is compared against the low voltage reference value V-ref (corresponding to voltage V2 in the first technique or voltage V4 in the second technique). The output signal Vout from this window comparator 81 will be at a low level when the input voltage is between the two reference levels and will be at a high value otherwise. The sensing circuitry can then measure the times T1 and T3 as being the time between the falling edge and the rising edge of the output voltage Vout.

A further alternative method for sensing the impedance across the supply terminals 33 is only to use a single measured value on the falling edge of the capacitor voltage. In particular, given that the sensing circuitry 37 knows both the duration T0 and the amplitude V0 of each measurement voltage pulse 67, then a fractional proportion of this amplitude value may be taken as the timing end point. Thus, the sensing circuitry 37 may calculate the time taken for the voltage across the capacitor 75 to fall to the given threshold value from the rising or falling edge of the voltage pulse 67. Alternatively still, the sensing circuitry 37 may simply measure the instantaneous voltage across the capacitor 75 at a predetermined time after the rising or falling edge of the measurement voltage pulse 67. When the impedance across the supply terminals 33 is large, the measured voltage will be larger than when the impedance across the supply terminals 33 is small. However, such absolute measurements are not preferred as they are more susceptible to noise and measurement error. Indeed, in the preferred embodiment, once the sensing circuitry 37 has made an initial determination of the state of the manually operable switches 26 or 26', the sensing circuitry 37 then compares the measurements obtained from successive measurement voltage pulses 67 in order to detect a change of state of the manually operable switches 26 or 26'. It does this by detecting a significant change in the measured times from one measurement to the next. Once the sensing circuitry 37 detects a change of state of the manually operable switches 26 or 26', it performs a number of additional measurements to confirm the change of state before changing the operating mode of the lighting device 1. These additional measurements are used in case the first measurement that indicated the change of state is caused by noise or measurement error, or in case it conflicts with measurement signal(s) from one or more other similar lighting devices 1 installed in the lighting circuit or 28 or 28'.

Interference between Multiple Lighting Devices

As mentioned above, multiple lighting devices 1 (like the one shown in FIG. 1) may be connected in parallel on a given lighting circuit 28 or 28', such as in a multiple fitting luminaire, chandelier or the like. Each lighting device 1 will generate its own set of measurement pulses 67 for impedance sensing when they are in the dormant and secondary modes of operation. When a measurement voltage pulse 67 is applied across the supply terminals 33 by one lighting device 1, the connection of the other lighting devices 1 will provide an apparent additional capacitive load measured across the supply terminals 33 (because of capacitor 75). This will change the charge rate and the decay rate of the capacitor voltage measured by the sensing circuitry 37. Therefore, again, during an appropriate calibration routine, the sensing circuitry 37 can refine, as appropriate, a threshold used to maximise the sensing accuracy of the sensing circuitry 37. From the charge up rate, the sensing circuitry 37 can also estimate the number of other similar lighting devices connected on the same lighting circuit 28 or 28' (since it knows the capacitance value of the capacitor 75 and it can assume that similar capacitors will be provided in the other lighting devices).

As mentioned above, the duration (T0) of each measurement voltage pulse 67 and the time period (T) between pulses are preferably selected so as to minimise the chances of two lighting devices 1 (which are connected in the same lighting circuit 28 or 28') from applying measurement voltage pulses 67 to the primary supply terminals 33 at the same time. In particular, if the period T is much greater than the duration T0 of each voltage pulse 67 (in this example embodiment, it is between 100 and 1000 times greater) then it will be quite rare for two or more lighting devices 1 to apply their measurement pulses across the supply terminals 33 at the same instantaneous point in time. The chances of such collisions can be reduced further by randomly or pseudo randomly varying the time period T between success measurement pulses 67. This may be achieved, for example, by using a constant period T and by adding or subtracting a randomly or pseudo randomly varying amount at each measurement point. The combination of this random amount and variations in the clock frequencies between the lighting devices 1 (an inherent difference between physical manufactured components) will likely reduce further the possibility of two or more lighting devices 1 applying their measurement pulses 67 across the supply terminals 33 simultaneously.

In the rare event that other lighting devices 1 do apply their measurement pulses 67 across the supply terminals 33 at the same or at similar times, an incorrect reading will be obtained. However, as mentioned above, in the preferred embodiment the sensing circuitry 37 uses the measurements obtained from a multiple of measurement pulses 67 before taking a decision. This means that the measurement obtained from a single pulse will not be used in isolation and therefore, errors caused by such simultaneous (or overlapping) measurements by other lighting devices 1 should not cause the lighting devices 1 to operate incorrectly, hence provide reliable operation.

In addition to varying the pulse period, T, to avoid collisions with other lighting devices 1, the pulse period T may also be varied for other purposes. For example, when the sensing circuitry 37 initially detects a change in the impedance across the supply terminals 33, the sensing circuitry 37 may shorten the period between successive pulses in order to confirm that the changed circuit impedance is both valid and sustained before the decision is taken to change the operating mode of the lighting device 1, thereby foreshortening this decision making period of time.

Conversely, the period between measurement voltage pulses 67 may be intelligently extended over time in order to conserve battery power. In particular, when the lighting device 1 is last switched from its primary operating mode (or its second operating mode) to its dormant operating mode, then the sensing circuitry 37 may be arranged to measure the impedance across the supply terminals 33 at a normal repetition period T. However, if the operating state of the lighting device 1 does not change during an extended period of time (for example for a number of weeks or months) then the sensing circuitry 37 may be arranged to extend the interval between measurement voltage pulses 67. Typically, the normal period (T) between measurement pulses voltage 67 is between 50 and 500 milliseconds; this period may be extended to, for example, the order of seconds. Delaying the measurement pulses in this way will significantly reduce the power drawn from the battery 17 during the dormant mode of operation, at the expense of the increased likelihood of a slight delay in switching on of the emergency lighting when needed and after a prolonged period in dormant mode. The period between measurement voltage pulses 67 may also be made dependent on the charge state of the battery 17. In particular, as the charge on the battery reduces, the processor 35 may signal to the sensing circuitry 37 in order to increase the interval (T) between measurement voltage pulses 67. In this way, the drain on the battery 17 can be minimised.

Master/Slave Operation

When there are multiple lighting devices 1 (such as those shown in FIG. 1) on the same lighting circuits 28 or 28', or in the same locality, interference between the lighting devices 1 may be reduced further by making one of the lighting devices 1 a master lighting device, which performs impedance measurements and by making the other lighting devices 1 slave devices, which do not perform impedance measurements. Such a master/slave pair of lighting devices is illustrated in FIG. 7. The master lighting device is designated 1-M and the slave is designated 1-S. In this case, when the master lighting device 1-M determines that there is a power failure it signals to the other slave lighting devices 1-S that they should enter their secondary modes of operation so that they will generate light using power from their internal batteries 17. Communication between the lighting devices 1 may be achieved using their communication transducers 25. Alternatively, the master lighting device 1-M may signal the other lighting devices 1 that are connected to the same lighting circuits 28 or 28' by applying a communication signal across the supply terminals 33. This communication signal may be modulated on to a suitable carrier frequency that will allow the slave lighting devices 1-S to differentiate the communication signal from any primary supply signal received at the supply terminals 33.

When the communication transducers 25 are used to communicate between the lighting devices 1 and one or more of the slave lighting devices 1-S are out of range of the master lighting device, one or more of the other slave devices 1-S that are within communication range of the master lighting device 1-M may operate as repeaters or relay devices in order that messages to or from the master lighting device 1-M can be communicated with such "out of range" slaves.

In order to limit interference caused by the electronic circuitry 19 of the slave lighting devices 1-S, each lighting device 1 may also include a relay or similar isolation or interruption device 77 that can disconnect its electronic circuitry 19 from the supply terminals 33. In this way, if a lighting device 1 has been configured as a slave device 1-S, then it will activate the isolation device 77 in order to isolate its electronic circuitry 19 from the supply terminals 33 in all operating modes except the primary operating mode. In this way, when the slave(s) and the master lighting devices 1 are in the dormant or secondary modes of operation, the master 1-M will perform the impedance measurements and all of the slave lighting devices 1-S will effectively be open circuit between the supply terminals 33 due to the isolation device 77. If the master lighting device (or some other device) determines that the operating mode should be changed, then the master lighting device 1-M signals the change of state to the slave lighting devices 1-S which adapt their operating modes accordingly. If the slave lighting devices are returned to their primary mode of operation, then they will deactivate the isolation device 77 so that the electronic circuitry 19 of the slave device 1-S is again connected to the supply terminals for deriving primary power.

Therefore, as those skilled in the art will appreciate, the provision of such an isolation device 77 in each of the slave devices 1-S can improve the effectiveness or efficiency of the impedance sensing due to removing possible interference created by the slave devices. Additionally, utilising only one lighting device as the master means that battery drain is minimised (at least on the slave lighting devices). The provision of such an isolation device 77 in a conventional light bulb would also be advantageous—as it would prevent any low impedance path through the conventional bulb form interfering with the measurements made by the master to determine if the light switches 26 or 26' are open or closed circuit. Such a light bulb would not have a battery or the sensing circuitry, although it would still need some form of intelligent PSU device to ensure the correct switching in and out of the isolation device 77, when the master is performing its measurements. In such an embodiment, in the event of primary power failure, only the lighting devices that have a battery 17 or other secondary power supply would provide emergency illumination and the other lighting devices that do not have the secondary power supply would clearly not.

With regard to determining which lighting device 1 is the master and which lighting devices are the slaves, this selection can be made by the user, for example setting configuration data in each lighting device 1, for example by sending configuration signals to each lighting device 1 using the communication transducer 25.

Alternatively, the selection may be made automatically depending on the order of connection to the lighting circuits 28 or 28'. In one embodiment, the role of master lighting device 1-M is rotated between multiple lighting devices in order to equalise battery consumption across the different lighting devices 1. For example, the master lighting device 1-M may be programmed to poll each of the slave lighting devices 1-S in order to determine their present battery charge. Depending on the result of this poll, the present master lighting device 1-M (or an external device) may determine that one of the slave lighting devices 1-S should become the master and an appropriate handover be performed.

Power Control Circuitry

As discussed above, the electronic circuitry 37 is powered either from a voltage generated from the primary supply across terminals 33 or from the battery 17 (or other charge storage device) arranged as a secondary power supply. Switching circuitry is therefore needed to select either the DC voltage derived from the primary supply or battery voltage from the battery to power the light array(s) 11 and/or the circuit components of the electronic circuitry 19.

The circuit arrangement shown in FIG. 8 can automatically allow the highest potential difference from either the primary source potential V (obtained by rectifying the primary supply voltage and output from the switch mode power control module 71 or from some other PSU); or the secondary source potential W (obtained from the battery 17), to provide continual electrical power to the processor 35 and the other electronic components of the lighting device 1. As shown, the circuitry includes two diodes 90-1 and 90-2, with the input of diode 90-1 being connected to the primary power supply potential V and the input of diode 90-2 being connected to the secondary power supply potential W obtained from the battery 17. As shown, the supply potential for the processor 35 is connected to the outputs of both diodes 90. Therefore, the processor 35 will draw its power either from the supply potential V or from the secondary battery potential W depending on their instantaneous values. Therefore, the circuit arrangement effectively provides a simple uninterruptible power supply (UPS) arrangement.

Other system elements (including the light source or array(s)) in addition to or instead of the processor 35 may be powered using the circuit arrangement shown in FIG. 8 (or variations of it). However in certain circumstances, particularly when the circuit arrangement is to power the light array(s), the voltage drop across the diode 90 is likely to cause inefficiency, especially when operating from the battery 17 since this voltage drop may represent a significant portion of the voltage available from the battery 17.

Thus any switching arrangement for switching between primary power and secondary (battery) power is required to have minimal voltage drop or operation inefficiency; whilst preventing the battery power supply from discharging to the primary power supply circuitry. In other words, sufficient full-isolation should be present to prevent connection of the battery directly to the mains-derived DC supply, otherwise there will be no control over the charging of the battery using power from the primary supply.

To avoid the voltage drop associated with the simple diode arrangement of FIG. 8, in the preferred embodiment, the circuitry 92 shown in FIG. 9 is used to control the drawing of battery power from the battery 17. Similar circuitry 92 may also be provided to control the drawing of power from the primary supply voltage(s) output from the switch mode power control module 71. As shown, the load control circuitry 92 has two inverse series connected metal oxide field effect transistors (MOSFETs) 93-1 and 93-2 arranged in a novel way to provide load control whilst preventing reverse current when in an inactive state. The inverse connection of the two MOSFETs overcomes the internal body diode properties inherent with any MOSFET device 93 which would otherwise lead to an undesirable voltage drop and/or current flow through the MOSFETs 93 when they are turned off.

As shown, the circuitry 92 includes an input terminal 94, a control terminal 96 and an output terminal 98. Input terminal 94 is the power input terminal which is connected to the battery 17 via terminals 34 (and illustrated here as being at potential X). The control terminal 96 is an active-low input for controlling the output from the load control circuitry 92, such that applying a negative potential with respect to the input terminal 94 (shown as potential Y) results in a positive output potential at the output terminal 98 (shown as potential Z) that is, in practice, marginally below the potential (X) at the input terminal.

Impedance device 100 (typically a resistor) provides a source of power to the control terminal 96 from the input terminal 94. This is relevant in the event of other system elements, such as the processor 35, entering a long-term hibernation or 'sleep mode' for prolonged or sustained periods, for example in between sensing due to low battery charge levels, until the primary power supply next becomes available. This impedance device 100 therefore keeps the control input terminal 96 close to the input potential (X) when the feeding control circuit (e.g. the processor 35) for control terminal 96 is in a high impedance or disconnected state. This ensures that the MOSFETs 93 remain off and thus maintain a high impedance between the input terminal 94 and the output terminal 98.

As shown in FIG. 9, the two MOSFETs 93 each have a gate (labelled G), a source (labelled S) and a drain (labelled D). MOSFETs have a problem in that there is always an inverse "body diode" inherent in the structure of the device. In order to remove this problem, two MOSFETs are connected in series such that the drain of MOSFET 93-1 is connected to the drain of MOSFET 93-2. This means that the inherent body diodes (illustrated and labelled 101-1 and 101-2 in FIG. 9) of the MOSFET switches 93 oppose each other. This eliminates the resulting issue of reverse current flow through the body diode when the MOSFET is not switched on. When the MOSFETs 93 are switched on, the voltage drop across the pair of MOSFETs is minimal and presents no problem to the operation of the circuit. This is a significant saving when compared to the normal battery voltage or the mains supply derived voltage(s) generated by the switch mode power control module 71 (which is typically a few volts). A similar advantage can be achieved if the MOSFETs 93 are connected so that the source of one MOSFET is connected to the source of the other MOSFET.

Therefore, by employing two opposing MOSFETs 93 in this manner, there is no problem of voltage drop across the MOSFETs 93 when they are switched on, and when the MOSFETs 93 are in a high impedance state, the two reverse-connected body diodes 101 prevent current flow between the input terminal 94 and the output terminal 98 caused by a potential difference between the primary power supply (obtained via the switch mode power control module 71 or otherwise) and the secondary power supply obtained from the battery 17.

Self Test Diagnostics

Diagnostic module 41 can be configured to perform self-tests for verification and diagnostic purposes. These may be performed continuously or intermittently based upon a time interval, or otherwise by command or event such as upon user demand through signals received via user operable switch commands, communications module 45 or the like. Alternatively, through monitoring circuit conditions which may include historical stored data and or real time measured values, such as relating to the charging and or discharging performance of the battery 17 or other secondary storage device, the tests may be intelligently scheduled at an appropriate times which, for optimum operational efficiency, may depend upon the present mode of operation of the system.

Tests may include software analysis of data collected over any period of time by processor 35 or other components of the circuitry 19. For example, in the case of verifying function and sufficient performance of battery 17 or the like, analysis may be executed using data collected from measurements of battery voltage and rate of change over time, either during times of charging by the charging circuit 39 (at which time the charge current may instead or in addition be measured by charging circuit 39 or otherwise, for subsequent use as a input data for this analysis), and or during periods when the battery 17 is not being charged.

The analysis may include applying an optional load to the battery 17 to affect a discharge of stored potential therein, thus providing the opportunity to acquire more relevant data measurements such as rate of decay of potential difference etc. This load could be a known load exclusively for this purpose, such as a designated switchable resistor, but may be the light source(s) 7 itself, a load which may be internally measured or approximated from known hardware parameters. In this case, the system may be operating in any mode, but preferably during either primary or secondary modes of operation during which light emission is already required and therefore such a test would go unnoticed. If the test is performed during the primary mode of operation, the battery 17 would provide some or all electrical power to operate the light source(s) 7 for a limited period of time over which data is collected for battery analysis. Such testing may be performed intermittently according to either automatic time scheduling (such as relating to data collected for age or amount of use), or manually (such as according to previous or historical test results, or even upon user demand). In the event of lighting circuit 28', testing may occur at some or all times that switch 26' is open circuit (momentarily operated by user) hence battery 7 may already be under load due to providing secondary power to the system or parts thereof. This testing may instead or additionally be performed in the case where, depending upon the battery technology being used, it is advantageous for the secondary power supply to be periodically partially or fully discharged, for purposes of extending battery life expectancy or maintaining performance through use cycling. Such a strategic full or partial discharge represents an ideal opportunity for combining both battery conditioning and/or maintenance with performance analysis as part of a diagnostic testing routine.

A full or substantial discharge is not desirable in terms of ability to operate in secondary mode during a power failure, hence such an operation is preferably limited to infrequent occurrence and upon user demand, such as in the case where emergency lighting regulations may require a test of duration performance. Alternatively a partial discharge test may provide sufficient data for an estimation of the battery capacity (either full potential or remaining) to be ascertained and displayed or communicated via diagnostic module 41 or communications module 45 or the like.

Advantageously, if the testing is performed during secondary mode when there is already a load present on the battery 17 (of the light source(s) 7), analysis of battery discharge can be performed to ascertain battery performance. Further advantageously, such a testing routine may additionally be used to predict or estimate the likely capacity remaining. Such information may, through control by processor 35 or otherwise, intelligently adjust the power taken from the battery to achieve or optimise current draw to ensure that the emergency lighting will give a minimum duration of lighting during a mains failure event, which may be adjusted periodically or constantly with such an aim in mind. Alternatively, such a capacity remaining or duration estimate may simply be stored or used and in some way communicated to the user, such as via diagnostic module 41 or communications module 45.

Modifications and Alternative Embodiments

In the above embodiment, a zener diode 73 was used to isolate the sensing circuitry 37 from the other components of the electronic circuitry 19 when the sensing circuitry 37 is making its impedance measurements. Various other techniques can be used to achieve a similar isolation. For example a relay or transformer could be used to perform the desired isolation. FIG. 10 illustrates three alternative arrangements using power supply transformers to isolate the sensing circuitry 37 from the other components of the electronic circuitry 19 when making impedance measurements. With these transformer designs, the transformer is used to step down the primary supply voltage to a lower voltage which can then be smoothed and converted into a DC voltage using a similar bridge circuit 69 to the one shown in FIG. 5. Whilst such transformer based isolation solutions are less sophisticated than the main embodiment described above, they do offer the advantage that they provide isolation between the sensing circuitry 37 and the primary power supply and isolation between the sensing circuitry 37 and the other components of the electronic circuitry 19.

In the arrangement shown in FIG. 10a, a transformer 82 having primary power supply (J) connected to its primary winding 84 and having secondary winding 86 divided into two parts—having a main secondary winding 86-1 that provides a step down potential K and a tertiary winding 86-2 that connects to the sensing circuitry 37. Operationally, during the primary mode when a supply potential J is present, the potential K (or the combined potential K+L) is used to provide the usual power for the electronic circuitry 19 and for powering the light sources 7. During the dormant and secondary modes, however, the primary potential J is no longer applied and the sensing circuitry 37 applies the measurement pulses across terminals L of the secondary winding 86-2. These pulses will, through normal magnetic flux operation of the transformer 82, induce signals into the primary winding 84. The connection of any circuitry across K will remain constant and therefore can be disregarded. Thus, changes in high or low impedance across J can be measured across L whilst remaining electrically isolated. Therefore, the sensing circuitry 37 can detect changes in the impedance of the lighting circuits 28 or 28' in which the lighting device 1 is connected, such as may result from the user switching on or off the user operable switches 26 or 26'.

FIG. 10b illustrates an alternative transformer arrangement, where two transformers 82-1 and 82-2 are connected in series across the primary power supply having potential M. The operation of this embodiment remains the same as that described above for FIG. 10a, with power taken across N in the primary mode and pulses being transmitted across P when the impedance sensing is being performed by the sensing circuitry 37 during the dormant and secondary modes. FIG. 10c alternatively shows a conventionally deployed transformer 82 providing potential difference R from the primary power supply input Q during the primary mode of operation; and a coil of wire 88 being placed around or in proximity to a connection of the primary winding 84 such that pulses applied across S result in currents being induced in the primary power supply lines. The induced current will depend on the impedance of the primary supply lines which will in turn induce a back EMF across S which can be sensed by the sensing circuitry 37.

In the above embodiment, the lighting device included a battery 17 for providing a backup or secondary power supply in the event of primary power supply failure. The battery can be of any technology, replaceable or non-replaceable and multiple batteries may be provided connected in series and/or in parallel. Each battery itself may comprise a single cell or multiple cells as appropriate to the battery technology. Where a multi cell battery is used, the charger may be arranged to monitor and charge each cell individually or groups of cells as desired. Alternatively, instead of using one or more batteries 17, other charge storage devices may be used to provide a secondary power supply, such as a capacitor. However, batteries are preferred since they can provide secondary power over a longer period of time. The secondary storage device is preferably mounted internal to the lighting device, but it can be mounted externally if desired. In one embodiment, the battery can be isolated from the electronic circuitry 19 so that the lighting device can only operate in its primary mode of operation. This may be done in response to a received user input or in response to detecting a battery fault or a fault in another system component.

In the above embodiment, the sensing circuitry 37 generated voltage pulses which it applied across the supply terminals 33 in order to measure the impedance across the supply terminals 33 due to external circuitry and potential loads thereof. In an alternative embodiment, the sensing circuitry 37 could include a current generator and could instead apply pulses of known current to one or both of the supply terminals 33 and could then measure the voltage across the supply terminals to determine a measure of the impedance between the supply terminals 33. Also, it is not essential to apply signal pulses to the primary supply terminals in order to determine a measure of the impedance. Other more conventional approaches may be used.

In the above embodiments, the light sources that were used in the lighting device 1 were LEDs. As those skilled in the art will appreciate, the use of LEDs is preferred given the ease with which they can be controlled (e.g. output intensity), their long expected operating life, rough handling ability and of particular advantage (given the battery-operation likelihood of the device) their low power consumption. However, the light sources can be formed from any lighting technology, whether solid-state variants such as OLED, or more conventional emitter technologies such as compact fluorescent tubes, incandescent lighting (such as halogen lighting) etc.

In the above embodiment, the lighting device took the form of a normal look-a-like light bulb or lamp. However, the lighting device can also take the form of an elongate tube similar to the common fluorescent "strip light" variety.

In the above embodiment the battery is mounted within a cavity of a heatsink used to extract heat from the light sources. As those skilled in the art would appreciate, the mounting of the battery and the use of this particular heatsink is not essential. The battery may be mounted in any convenient location and the heatsink can have any desired form or can be omitted if desired. When the heatsink is provided, it may be formed from an electrically conductive material and coupled to a capacitive sensing circuit that can thus sense when a user touches or comes into close proximity to the heatsink. For example, the heatsink may include a one or more electrically conductive plates (which may also act as cooling fins) that are electrically connected to a charge measuring circuit. The measuring circuit can then determine a value based upon charge measurement techniques (well known to those skilled in the art), which value will change in the event that the capacitive field is interrupted or altered, such as by a user touching or entering a part of his or her body in the vicinity to the plates. This user input can be used, for example to control the operation of the lighting device, such as to control the operating modes or to control the brightness of the lamp in dependence upon a measured time that the user approaches or touches the heatsink. Other technologies may also be used to perform this proximity sensing, such as short range radar devices or the like.

In the embodiment described above, the lighting device included diagnostic and communication circuitry. As those skilled in the art will appreciate, this circuitry is not essential and could be omitted if desired. Additionally, one or more user switches or inputs may be mounted on the lighting device. This user input can be used to cause the lighting device to enter a given mode of operation or to enter user configurations or to initiate a diagnostic or self-test or indicate results thereof.

In the above embodiment, the lighting device included a communications module 45 that was able to communicate with external devices using a communication transducer 25. In an alternative embodiment, the communications module 45 may be arranged to communicate with the external devices by receiving and/or transmitting signals over the lighting circuitry 28 or 28' in which the lighting device 1 is installed. Such communication signals would be transmitted at a different frequency to the mains signal in order that the communication signals can be separated from the mains signal. Instead of or in addition to using the communication transducer 25, the electronic circuitry 19 could communicate with one or more remote devices by varying the light produced by the light sources 7. For example switching them on and off in dependence upon the data to be transmitted. A receiver in the remote device would recover the data by detecting the variation in the light produced by the light source(s) 7. Regardless of the communication technique employed, various different standard communication protocols could be used for the communications between the lighting device and the remote device(s).

In the main embodiment described above, the electronic circuitry 19 included a diagnostic module 41 for performing diagnostic tests and for controlling diagnostic indicators 23 to indicate the diagnostic test results. As discussed, the diagnostic test could be used, for example, to determine the remaining charge capacity of the secondary power supply (e.g. the battery 17), which could be indicated via a coloured indicator 23 or pulse variations of an LED indicator 23. A problem with this arrangement is that when the lighting device 1 is producing useful light, this general illumination is likely to mask the visibility of the diagnostic indicator(s) 23.

This problem can be overcome, however, by deploying the diagnostic indicator(s) 23 for a period of time shortly after the lighting device 1 stops producing useful light (for example when the lighting device transitions from its primary mode of operation into its dormant mode of operation). Alternatively the light array(s) may be partially or fully employed to act as an information indicator for diagnostic, status, fault, condition or other purposes. For example, the light generated by the light array(s) 11 could be pulsed depending on the remaining battery charge, as measured and controlled by the electronic circuitry 19. The user can optionally configure the way in which this is achieved by storing appropriate user configuration parameters within the electronic circuitry—for example using a remote control device that communicates with the device using the communication transducer or user switch 26 or 26' combinations.

In the above embodiment, a user was able to set various user configurable parameters of the lighting device 1 using the communication transducer 25 and a remote control device. Alternatively, the lighting device 1 may have an additional configuration or 'setup mode' that allows certain simple configurations to be defined, choices selected and changes saved upon exit, all via changes in the primary power supplied to the lighting device 1 made by the user opening and closing the user operable switches 26 or 26'. For example, the electronic circuitry 19 may be arranged so that if the user switches the primary power supply to the lighting device 1 three times within 3 seconds, it will enter a setup mode, and one cycle within the next five seconds thereafter to select a specific option etc. Light sources 7 or diagnostic indicator 23 may signal or otherwise indicate information to the user to verify that changes made have been received, interpreted and stored successfully. Such a configuration technique would be simple and cheap to implement and would allow the user to select certain other control parameters defining the unit's operation. This can include, but is not limited to defining: emitter brightness in primary or secondary modes, and the change in illumination quantity during secondary mode over time or according to the electrical charge remaining in the secondary power supply etc. This configuration technique can also be used to define if the lighting device 1 has been or will be installed in a conventional lighting circuit (as illustrated in FIG. 2a) or in a lighting circuit that provides virtually permanent primary power to the lighting device 1 (as illustrated in FIG. 2b). This technique can also be used to configure how the lighting device will respond to the different external conditions (discussed above with reference to FIG. 4). In addition to detecting the number of times the user activates the switch 26 or 26' in any given time period, the duration that the user switches the switch could also be used for programming the device. Thus, for example, the user may press the switch 26 or 26' four times within a three second interval—indicating to the lighting device that a setup mode is to be entered. The user then holds the switch open circuit for a period of time that depends on the operating mode to be selected. Therefore, by measuring the time that the switch is open circuit after entering the setup mode, the processor can determine the operating mode that the user wishes to select. In addition to using this repeated switching technique to set user configurable parameters of the lighting device, this technique could also be used by the user to control the dimming of the lighting device—for example using each activation of the switch 26' to increase or decrease the brightness of the light sources 7. This approach has advantages over the time interval based approach described above with reference to FIG. 4c in that the user does not need to keep the switch 26' open circuit for long periods of time, which can reduce the energy stored in the battery 17. Indeed, in such an embodiment, the power needed to run the electronic circuitry 19 and to maintain the power to the light sources may be fully or partially provided by charge stored on a capacitor (forming part of the electronic circuitry 19) instead of from the battery 17—since primary power is only removed for relatively short periods of time. Similarly, the technique described with reference to FIG. 4c may be used for setting user configurable parameters of the lighting device instead of solely for dimming purposes.

In the above embodiments, if a number of similar lighting devices are connected in the same lighting circuit, provided all of the devices are installed in the same operating state, all the lighting devices will react in unison, making it possible to have many lighting devices on the same circuit and still perform the dimming operations, configuration of operating modes, diagnostic testing and the like. For dimming operation as described above when multiple lighting devices are used, upon commencement of dimming mode (or periodic occurrence thereof with reference to time) it may be advantageous for all devices to start at the same brightness level (e.g. maximum brightness) rather than at any stored level. Thus any variations in illumination minimum and maximum levels or cycle times thereof (such as caused by slight differences in each processor 35 clock, timer or other electronic circuitry 19 variations) will not be compounded or otherwise accumulated over time. Using previously described signalling methods such as with distinct signals via successive operation of the user operable switches 26 or 26', a reset of the latching module 36 may be instructed in the event that multiple lighting devices 1 installed on the same lighting circuit 28' become out of syncopation with each other. Such a reset may optionally include preset brightness levels and other such software stored variables or modes of operation which may have been changed (by the user or otherwise) from default settings.

In the above embodiments, the lighting device could be installed in a conventional lighting circuit (like that shown in FIG. 2a) or in a lighting circuit that provides a virtually permanent primary supply (like that shown in FIG. 2b). The main difference between the circuits is that in FIG. 2a the switches 26 isolate the lighting device from the primary supply, whereas in FIG. 2b, the switches 26' only temporarily isolate the lighting device from the primary supply. In other words, users can easily adapt their existing wiring to provide such virtually permanent primary supply, simply by changing the switches 26 from isolating switches to momentary switches 26'. As discussed above, the advantage of operating the lighting device in the lighting circuit shown in FIG. 2b is that the lighting device can then replicate the operation of existing emergency lighting systems (but at a fraction of the cost). Further still, it would be possible, in any given installation to have some lighting circuits wired with conventional isolating switches and to have others wired with momentary switches and indeed to have some circuits wired with both types of switches. For example, in such a dual switch system the conventional switch 26 could act to turn the emergency lights on the circuit off; or to switch in an impedance for simulation of a power failure for test purposes, in which case a subsequent momentary switch or switches 26' could still function as described if on the circuit between the lighting devices and the output of the conventional switch or switches 26. The lighting devices mounted in the lighting circuits with the momentary switches can then be used to detect primary power supply failure (even when they are switched off) and then inform the lighting devices mounted in the conventional lighting circuits of the primary power failure using the communications transducer. (As mentioned above, the light sources mounted in the conventional lighting circuit cannot detect primary power failure if the switches 26 are open circuit.)

In the embodiment described above, when the lighting device is installed in the lighting circuit of FIG. 2b, the momentary switches 26' disconnected the lighting device from the primary power supply—that is they broke the circuit temporarily. In an alternative embodiment, the momentary switches 26' may keep the lighting device connected to the primary power supply, but instead switch in a measureable impedance such that the lighting device can differentiate the impedance across its primary supply terminals 33 when the switch 26' is not activated and when it is activated. Alternatively, the switch may switch an electronic device into the circuit in order to change the primary signal supplied to the lighting device. For example, the switch 26' may switch in a diode into the circuit 28' so that the primary power supply provided when the user activates the switch is half wave rectified. The lighting device can detect this change in the primary supply signal and accordingly determine that the user has activated one of the user switches 26'. Such an embodiment offers the advantage that (provided there is no primary power failure), primary power will be delivered to the lighting device when the switch is activated and when it is not activated. As a further alternative, the switch 26' may toggle for a predefined period of time regardless of how long the user holds the switch. In this case, the time based dimming control discussed above could not be used, although the brightness may be set by the user through repeated activations of the switch 26'.

In the operating mode described with reference to FIG. 4a, the processor took its control action after the user released the switch 26'. This is not essential. For example, the processor may be arranged in alternative embodiments to take its control action as soon as the initial change of external conditions is detected or some predefined time after that or after the user has released the switch.

In the above embodiments, the lighting device included a latching device that maintained system state information (from one user operation to the next) to allow correct operation when a permanent (or virtually permanent) primary supply is provided to the lighting device. The use of this latching device can be configured by the user and if the lighting device is to be installed in a conventional lighting circuit 28 then its use is not needed. The latching module may be formed from one or more discrete devices such as flip flops or other latching circuit components. However, it is preferably formed by memory and software code that is run by the processor 35. The latching module may be arranged to maintain the previous state information until new state information is available. Alternatively, the latching module may maintain a history of previous state information and the control action taken by the processor may depend on the present state information held by the latching module and/or may depend on the historical state information. The state information may also be reset, for example after a predetermined period of time has elapsed or if the available battery capacity reduces below a defined or otherwise determined threshold level.

In the above embodiment, a latching module 36 was provided that maintained the present output illumination state of the light sources being controlled by the electronic circuitry 19. As an alternative to using such a latching module, one or more sensors could be provided that sense, for example, the present illumination state of the light sources or the electrical current supplied to each light source. In such an embodiment, when the processor detects that the user has pressed the momentary switch 26', the processor can obtain a measurement from the (or each) sensor and from the sensor output(s) determine the illumination state (for example on/off/brightness level) of the or each light source.

In the above embodiment, a timer was provided and used by the processor to control detection of user activations of the momentary switches 26'. This timer may be implemented as part of the general timers available to the processor or may be a custom timer used for this purpose.

In the above embodiment, the user configured the lighting device to define whether or not the lighting device is being installed with conventional isolating switches (FIG. 2a) or with momentary switches (FIG. 2b). Alternatively or in conjunction with such mode selection techniques, the lighting device could determine itself which type of switch or switches are in use through analysis over time of the primary supply it receives, such as during the first few state transitions after initial installation or first receipt of primary power. This could be achieved by several methods, such as a comparison between primary power off and on times between first power up and the first few switch operations, whereby short 'off' periods compared with power 'on' times would suggest use of momentary switches and similar times between states suggesting use of traditional bi-stable switches.

In the above embodiment, the lighting device 1 had a number of light sources of the same type (in this case LEDs) arranged into two groups that were independently driveable by the electronic circuitry 19. FIG. 11 illustrates an alternative embodiment that has different types of light sources, each being of varying design, type, technology or the like. The general operation of this embodiment is the same, with the exception that the two or more types of light emitters may be advantageously utilised to achieve several improvements over the embodiment shown in FIG. 1. These improvements include, reduction in power consumption verses quality and quantity of light output, manufacturing cost, and built-in redundancy for an increased margin of safety or component lifespan. In particular, this arrangement allows light sources that are optimised for primary illumination to be used when the primary supply is present and allows light sources that are optimised for emergency lighting (requiring lower power to drive them) to be used when there is a power failure. Additional advantages of this multi-emitter approach include potential for extended product life and safety margins through built-in redundancy, particularly critical for emergency lighting systems, with scope for system separation within the electronic circuitry 19 in which the primary emitter remains for use only during primary mode.

In the embodiment shown in FIG. 11, the two different light sources comprise an LED array(s) 91 and a compact fluorescent tube 93 with associated ballast circuitry 95. Electronic control circuitry 19 is joined, by connection 97 (comprising typically two wires), to fitting 5 such that the primary supply may provide electrical power for operating the LED array(s) 91 and/or the compact fluorescent tube 93 in the primary mode, with the same connection 97 being utilised for impedance sensing to ascertain external circuit conditions as before. An appropriate secondary power supply (such as battery 17) can provide back-up power as before for powering at least the LED array(s) 91.

The electronic circuitry 19 may control combinations of the light sources 91 and/or 93, such as utilising compact fluorescent tube 93 for primary mode operation when the primary power supply is available (potentially augmented by light from the LED array 91), and utilising the LED array(s) 91 as the sole emitter during secondary mode when the primary power supply is interrupted and only the secondary power supply is available. In this embodiment, the compact fluorescent tube 93 may be powered directly by the AC primary supply in the primary mode of operation. This can be achieved by various methods such as direct permanent connection to the primary supply incoming via fitting 5, or replacing the output driver 50 used for the fluorescent tube 93 with a relay switch or other control that is directly connected between the primary input power terminals and the fluorescent tube 93 and that is controlled by the processor 35 or the power supply unit 31.

In this embodiment, the electronic circuitry 19 may include circuitry to detect, for example, if the light source normally used for primary illumination is faulty or has failed. If so then the electronic circuitry 19 can use the other light source for primary illumination instead. The electronic circuitry 19 can detect such a failure either by measuring the impedance across the terminals of the light source (and inferring from this measure if the light source is operational) or using a photo-sensor that can detect if the light source is actually producing light or using current measurement techniques.

In the main embodiment discussed above, the lighting device 1 was a single unitary device. In alternative embodiments, some of the components and some of the functionality may be moved to another device which controls the powering of a lighting device (such as a conventional bulb). This may be achieved, for example, using an in-line adapter that sits between a conventional light bulb and the lamp holder. Such in-line adapter embodiments are illustrated in FIG. 12. As shown, the in-line adapter 101 sits between the primary power supply 103 and a conventional lighting device (or devices) 105. The in-line adapter 101 may be a readily interchangeable device such as the arrangement shown in FIG. 12a, or a permanent or semi-permanent installation such as the example shown in FIG. 12b.

The in-line adapter 101 will typically have the same electronic circuitry 19 as in the first embodiment, enclosed within a suitable housing or casing 107. This can then be retrofitted to an existing lighting circuit by connecting the fitting 5-1 of the in-line adapter 101 into an appropriate vacant lamp holder 24 providing mechanical and electrical connection to the primary power supply 103. A plurality of lamps or lighting devices, shown here as a single conventional light bulb 105 having light fitting 5-2, mechanically and electrically interface with a lamp holder 109 that forms part of the in-line adapter 101.

During primary mode operation, a switching device 113 such as a mechanical or solid-state relay controllable by the electronic circuitry 19 allows power from the primary power supply from 103 to be routed to the lamp holder 109 for purposes of powering the light bulb 105. This switching device 113 may be controlled by the electronic circuitry 19, and is an important requirement specific to this in-line adapter embodiment, since the required impedance sensing technique for detecting external switch positions cannot be reliably performed when certain types of conventional light bulbs (ones having a low internal impedance) are connected across the primary supply terminals 103—as the presence of such a conventional low impedance light bulb may cause the sensing circuitry 37 to determine that the manually operable switches 26 or 26' are closed circuit when in fact they are open circuit. Thus, when impedance measurements are to be made, the switching device is activated to disconnect the conventional light bulb 111 from the supply 103.

An additional feature that can be performed by the electronic circuitry 19 in this embodiment (because of the presence of the switching device 113) is that it can allow the illumination of the light sources 91 on the in-line adapter 101 during the primary mode without illuminating the conventional light bulb 105 such as for test purposes. This could be triggered by signals received from an external device such as from an external user-controlled remote controller, using the communication transducer 25 shown here for example conveniently integrated within the LED array 91.

The electronic circuitry 19 may also have the ability to detect the failure or removal of the light bulb 105 from the adapter 101, so that if the primary power supply is available to the in-line adapter 101, the electronic circuitry 19 can still provide useful illumination using the LED array 91 powered from the primary power supply. Sensing that the light bulb 105 has failed or been removed from the adapter 101 can be achieved by various methods, including measuring the electrical impedance across or current through terminals of the lamp holder 109. In particular, when the light bulb 105 has failed or been removed from the holder 109 there will be a high impedance across the terminals of the lamp holder 109. This high impedance can be detected by applying a test voltage across the input terminals of the lamp holder 109 (when the lamp holder 109 has been isolated from the rest of the primary supply 103 (using the switching device 113) and sensing the current drawn. Alternatively, a low current drawn by the lamp holder 109 when the primary supply 103 is supplied to the terminals of the lamp holder 109 is also indicative of a failed or removed light bulb 105. Such low current draw can be detected by measuring the voltage drop across a purposely included resistor (not shown) that is connected in series with the terminals of the lamp holder 109, or by using any other current sensing transducer.

Instead of using such an electrical detection method (for detecting a failed or removed light bulb 105), one or more light sensors may instead be employed to measure external ambient light levels. One such photo-sensitive semiconductor device 117 is shown in FIG. 12a, conveniently integrated within the LED array 11. This photo-sensitive semiconductor device 117 can be controlled and monitored by the electronic circuitry 19, and used to ascertain if light bulb 105 is producing useful illumination by way of monitoring the change in light levels before and after switching device 113 is activated to connect the lamp holder 109 to the primary power supply 103. If no appreciable increase in light level is observed then there is a high likelihood that light bulb has failed or been removed from its holder 109.

Regardless of the detection method used, such a feature is desirable in mission critical deployments, and greatly increases the reliability and versatility of the in-line adapter 101 in its primary mode of operation. In particular, when the adapter 101 initially detects the failed lamp, it can automatically switch on the secondary light source(s) 11 to give the user a visual warning that the primary light bulb 105 has failed—even though the light is switched off at the switch 26' or subsequently switched off and primary power removed by switch 26. This initial warning can then be switched off by the user, for example, by switching the switch 26 on and off or momentary activation of switch 26'. Thereafter, every time the user switches on the switch 26, illumination will be provided by the secondary light source(s) until the primary light bulb 105 has been replaced. Further, the provision of backup emergency illumination when the light bulb 105 has failed or been removed provides light for the user when they are replacing the failed or removed light bulb 105. Upon activation and testing or verifying that the primary light bulb 105 has failed, switching device 113 may optionally inhibit or otherwise isolate connection of the mains power supply to lamp holder 109 for safety reasons whilst the user may be replacing the conventional lighting device or bulb 105 or 111.

The photo-sensitive semiconductor device 117 may additionally be utilised to perform other specialist functions as may be selected by the user, or pre-selected within preferences stored in memory of the electronic circuitry via an external control device such as user-operable remote controller that communicates with the in-line adapter 101 via the communication transducer 25. Specialist functions could for example include the ability for the light bulb 105 and/or the LED array 91 to provide illumination from any available power supply for a predetermined time interval when ambient light levels have (prior to the provision of the illumination) been measured to fall below one or more threshold values over time.

An alternative embodiment of an in-line device 101' is illustrated in FIG. 12b, in which the in-line adapter 101' is incorporated in proximity to or within the ceiling rose forming the usual junction for electrical connection and mechanical suspension of a pendant light 111 (as shown), multiple lamp chandelier or the like. The operation of such as system remains the same as that outlined for FIG. 12a.

Thus light array 91 may provide more prominent illumination, in the secondary mode or otherwise, due to its advantageous positioning above that of the pendant light bulb 111. In this illustration, the light array 91 is formed from a plurality of individual LED emitters 9 arranged in multiple rings to utilise the additional space created by detachment of lamp holder 109 via the lighting cable 121. Furthermore, the aesthetic design constraints of such an in-line device 101' are harmonised since it may be at least partially housed in enclosures similar to existing hardware and or using conveniently available space voids, here shown partially located within the ceiling juncture 123.

The in-line device 101' shown in FIG. 12b is designed to be installed on a more permanent basis. Therefore, fitting 5-1 has been replaced with a suitable electrical interface that enables electric wires or cable to be connected thereto. The example illustrated in FIG. 12b shows such an arrangement, with a plurality of terminal blocks 125 housed within enclosure 127 which may or may not be integral to the main enclosure housing 107 of the in-line adapter 101'. If the enclosure 127 is separate from the main housing 107 of the in-line adapter 101', then an additional detachable interface may be included to interconnect components within enclosures 127 and 107. This yields the advantage of allowing convenient interchangeability of such a semi-permanent in-line embodiment, including the ability of the in-line adapter 101' to optionally retrofit an existing interface such as a pre-installed ceiling rose that permits straightforward interchange of various suspended lighting devices to be utilised without manual electrical installation. Further advantages include a greater accessibility to the main housing 107 allowing easier battery 17 replacement, and naturally the safety and time advantages in not having to make permanent electrical connections between the in-line device 101' and the primary power supply 103.

In the main embodiment described above, the electronic circuitry 19 used for controlling the lighting device was mounted within the housing of the lighting device itself. In an alternative embodiment, the electronic circuitry used to control the light sources may be provided in a separate housing. Such an embodiment would allow the invention to be able to operate, for example, with conventional "low voltage" lamps. Such a conventional low voltage lamp typically comprises multiple low voltage light emitters forming a plurality of luminaries. These historically featured incandescent lamps, usually tungsten halogen technology, although retrofit LEDs in traditional lamp holders, such as the MR series holders, have been available in recent years. Such low voltage lighting systems typically utilise a supply potential difference below 50 volts (either AC or DC) provided by a power supply unit (PSU), which usually comprises a conventional transformer or switch mode power circuit. The PSU is typically fed by a mains power supply which it then converts and supplies for powering one or more lighting devices. Unfortunately, the lighting device 1 shown in FIG. 1 does not directly lend itself to retro-fitment into such a low voltage lighting system. Apart from the overall size of the lighting device 1, the main problem is that the PSU unit that powers the low voltage lighting will inhibit the usual impedance sensing performed by the sensing circuitry 37 because there is no direct connection to the primary power supply on the input side of the PSU. One workaround to this problem is to rearrange the wiring of the lighting circuit 28 or 28' such that any user operable switches are located on the output side of the PSU rather than on the input side. However, as well as the additional effort required to perform the rewiring, such an arrangement will also mean that the mains supply is constantly fed into the PSU input and this will invariably cause inefficiency due to heat losses associated with the PSU.

On the other hand, if the conventional low voltage PSU is replaced by a modified PSU that contains at least the main components of the electronic circuitry 19 shown in FIG. 3, then this will overcome these problems. Such an embodiment is schematically illustrated in FIG. 13. As shown, the electronic circuitry 19 is mounted in a separate housing 131 that can be placed anywhere on the lighting circuit 28 or 28' so that the sensing circuit 37 can sense the impedance across the primary power supply terminals 33. In this case, the housing also includes a secondary power supply in the form of a battery 17. The output terminal(s) 49 and/or 51 (shown in FIG. 3) from the electronic circuitry 19 are then directly connected to the conventional low voltage lamp holder(s) 133 and thus the low voltage lights 134 will be powered either by power derived from the primary supply and/or from power derived from the secondary supply (the battery 17 in this example). In such an embodiment, the secondary power supply (such as the battery) may be mounted in the same housing 131 as the electronic circuitry 19 or it may be provided separately, for example, within a loft or ceiling space and connected to the electronic circuitry 19 at terminals 34. The secondary power supply may provide power directly to the low voltage lights or through a voltage-transforming PSU or the like (not shown).

The housing 131 may include additional output terminals 49 that receive converted supply signals in the usual way (i.e. converted from the AC mains voltage to the required DC supply voltage)—so that lights attached to these additional output terminals do not receive emergency power from the battery back-up in the event of a primary supply failure. In this way, the modified PSU arrangement within housing 131 may control a number of lamp holders 133, but may only provide emergency lighting to a subset of those lamp holders.

Instead of the light source(s) being directly connected to the output terminals 49 of the electronic circuitry 19 in housing 131, the electronic circuitry 19 may transmit control signals using a communication transducer 25 to the lighting device(s) to instruct them to power their light source(s) using secondary power from its own secondary power supply (such as its own battery). FIG. 14 illustrates such an embodiment. As before, the communication transducer 25 can be of any type—such as electromagnetic (e.g. RF or infra-red) or acoustic. Control signals transmitted from the electronic circuitry 19 in the housing 131 would be received by a corresponding communications transducer 25 mounted in the lighting device 1. In this embodiment, the electronic circuitry 135 mounted in the lighting device 1 does not need to have the sensing circuitry 37. It only needs communication circuitry 45—to be able to communicate with the electronic circuitry 19 mounted in the remote housing 131; a power supply unit 31—for controlling the application of power either from the primary supply or from the lighting device's own associated secondary power supply 17 and the appropriate output driver(s) 50 or relays. As those skilled in the art will appreciate, communication between the lighting device 1 and the circuitry in the housing 131 may be two way—so that, for example, the lighting device 1 can acknowledge receipt of control signals back to the circuitry within housing 131. Such two way communication also allows remote testing of the lighting device 1, for diagnostic or self test purposes without the need for physical contact. For example, the control signals may instruct the lighting device 1 to perform a self test and to output diagnostic results via the diagnostic indicator 8 or to transmit the results back to the circuitry in the housing 131. The information transmitted back to the housing 131 may also include operation statistics for the lighting device 1—such as time periods between being in its different operating modes, measured impedance values etc.

The housing 131 may also include a user interface (keypad, display switches etc) that allows a user to enter control commands, user configurations etc, for controlling the lighting devices 1 with which the circuitry in the housing 131 is arranged to communicate.

Instead of transmitting the control signals over a wireless link, the electronic circuitry 19 mounted in the housing 131 may transmit the control signals over the mains supply lines to the lighting device(s) 1. In this case, if any of the manually operable switches 26 are open circuit or switches 26' momentarily operated and hence open circuit, the lighting device 1 will not receive the control signal. This however does not matter as any open circuit state will be temporary for lighting circuit 28', and for conventional lighting circuit 28 the user is not expecting the emergency lighting to illuminate when the manually operable switches 26 are open circuit. Once the switches 26 are closed, the lighting device 1 will receive the control signal (which may be continuously or intermittently transmitted by the circuitry in the housing 131) and thus turn on its emergency lighting using power from its secondary power supply when the secondary power supply has failed.

As a further alternative, the circuitry in the housing 131 could be arranged to transmit a control signal whilst the primary supply is present at its input and to stop transmitting the control signal if there is a power failure (i.e. a fail safe system). In such an embodiment, the circuitry in housing 131 would not need its own secondary power supply 17. As long as the lighting devices 1 receive the control signals from the circuitry in the housing 131, they will know that primary power is available (although perhaps switched off at a user operable switch 26). If the lighting device 1 stops receiving the control signal, then it can assume that primary power has been lost and it can either directly illuminate its light source(s) from its secondary power supply or it can first try to sense if any of the user operable switches 26 are open circuit first, before using power from the secondary power supply (of course in this case, the electronic circuitry 135 in the lighting device would require the sensing circuitry 37).

As a further alternative to this embodiment, the electronic circuitry 19 mounted in the housing 131 does not need to sense the impedance across the supply lines. If the housing 131 is mounted close to the main fuses or circuit breakers 22 of the building, then the circuitry in the housing can detect the power failure simply by sensing if there is any mains power. If mains power is lost, then the circuitry in the housing 131 can signal the loss of power to the lighting device(s) 1. Advantageously, this can be signalled over the lighting circuit 28—so that if the switches 26 are open circuit, the control signal will not reach the lighting device 1 and so they will not produce their emergency lighting. However, if the switches 26 are closed, then they will receive the control signal and can automatically switch on their light source(s) using power from the secondary supply.

In one embodiment, local or national control centres may be provided to control the lighting devices 1 in different buildings. For example, control signals may be sent to lighting devices 1 in order to inhibit their operation—for example by disconnecting their light sources from the primary supply terminals 33 using an appropriate isolating device such as a relay. Thus, even if the user switches on the light switch, the lighting device 1 will not produce light. This could be used, for example, to switch off lights in a building at night. Conversely, one or more lighting devices may be remotely controlled to switch on in order to illuminate a given area. These remote control devices may be stand alone devices or they may be part of a larger system—such as an alarm system. For example, in the event that a fire is detected in a building, the lighting devices 1 in that part of the building may be remotely controlled to switch on—to provide emergency illumination to aid occupant escape or search and rescue. As those skilled in the art will appreciate, in any such system involving communication between a number of different devices, they will each need an address or ID number to allow communications to be targeted to individual lighting devices 1 or at least to individual groups of lighting devices. Of course signals for all devices may be transmitted without an address—such as an "emergency" signal to cause all the emergency lighting to come on.

Optionally, one or more detection devices (e.g. smoke or fire detection) may be provided integrally within the lighting device 1 or adjacent to it and they may use the same primary power supply or secondary power supply to operate. In such an embodiment, the secondary power supply or source (such as a battery) may be partitioned in its deployment, for example through intelligent monitoring to inhibit battery use for emergency lighting when the battery capacity falls below a threshold capacity; in order to maintain a reserve store of power to allow continued operation of the built-in detection device(s) and in the event of detection, the provision of emergency illumination from the battery for an adequate time before the battery becomes completely exhausted. In this way, if there is a power failure, the charge in the secondary supply will not be depleted such that emergency lighting cannot still be provided during critical emergency situations—such as when a fire is detected. In such an embodiment, the lighting device 1 may include an optical or acoustic receiver that detects when the fire or smoke alarm is activated and in turn it may activate its emergency lighting functionality. Alternatively, the lighting device 1 may be signaled to activate via an electrical control signal directly from the alarm or from a central alarm station via a wireless signal or over the mains lighting circuit 28 or 28'.

The lighting device 1 may also include an audible emitter for producing an audible alarm in the event of an emergency that is able to augment emergency illumination when a signal has been received and or an emergency condition detected. The audible alarm may be powered by either primary or secondary power supplies according to availability and optionally user configurable parameters.

Optionally, the alarm may also augment emergency illumination when a power failure or other defined event has occurred. For example, an audible sound may be generated upon change of operating state, or when certain operating conditions (such as low battery or a device fault) are detected. The alarm may intermittently or continuously provide the user with an audible indication of the state or condition that triggered the alarm. This arrangement could be particularly advantageous for example to alert the user that a power failure has occurred when the lighting device has entered its secondary mode of operation, in an embodiment where the lighting device is arranged to provide emergency illumination that is of equal brightness compared to the illumination when powered by the primary supply (which failure thereof may otherwise go unnoticed). The alarm could additionally be used to provide audible warning of low battery status such as after prolonged secondary mode operation.

In a modified embodiment, as well as the user being able to control brightness level during secondary mode operation, a minimum duration of light illumination may be set or preset (via remote, communications module, upon manufacture or otherwise configured) and the power used by the lighting device may be controlled by reducing light source brightness (with an optional minimum brightness level set or preset) according to estimated or measured battery capacity (as determined from the above described diagnostic methods or otherwise), to ensure a minimum time period of secondary light production. With statutory regulations in mind (3 hours minimum in UK for emergency lighting) such a method could improve efficiency, optionally varying brightness over time to give the best compromise between brightness above minimum mandatory levels and duration according to accurate battery capacity estimations. Such battery capacity predictions determined using measured discharge data will of course take into account degradation over time and use.

The diagnostic tests described in the first embodiment may also be implemented to verify functionality and or performance of other system elements, such as light source(s) 7 or individual emitters 9 or arrays 11 thereof. For example, the light sensor 117 shown in the in-line adaptor embodiment in FIG. 12 could be employed to ascertain that collectively the light emitters are performing to a required standard or threshold. Measured values may alternatively be analysed and employed for purposes of brightness adjustment or optional feedback thereof by light source driver(s).

In a modified embodiment, as well as brightness levels produced by light source(s) 7 being a changeable parameter adjustable via processor 35 through output driver 50 control or otherwise, optionally the colour temperature of the light produced by light source(s) 7 may also be varied. This can be achieved by various methods such as for an LED light source, changing the brightness of individual light emitters 11 and/or arrays 9 wherein arrays or LEDs therein have different colour temperatures, thus allowing variance of the overall colour temperature of light emitted from light source (7) within the lighting device 1. Such a variance could be advantageously utilised to allow control of the quality of light produced, such as achieving a preference of subtle colour temperature (e.g. warm white verses cool white light) or allowing a full 'RGB' colour range for mood or atmospheric lighting purposes. Such control could be implemented by the user, such as through a remote control device via communications module 45 or otherwise, or optionally by the processor itself for strategic purposes such as to form a visual diagnostic system that may replace or augment diagnostic module 41. Optionally colour temperature adjustments could be made in conjunction with dimming operations to vary the brightness level and associated colour temperature at said brightness level.

In the above embodiments, the lighting device 1 had a pair of primary supply terminals for connection to a primary supply, such as a mains supply circuit. In addition, another (separate) pair of terminals may be provided on the lighting device for connecting the lighting device to another power source. This other power source may be, for example, from a renewable energy source such as a photovoltaic cell or a wind turbine or the like. The power received from this additional AC or DC supply may be used to light the light sources and/or to charge the battery 17 via optional additional power supply control and management circuitry internal or external to the lighting device.

The invention claimed is:

1. A lighting control apparatus comprising:
   a primary input power connection for connection to a primary power supply circuit external to the lighting control apparatus;
   a secondary input power connection for receiving secondary power from a secondary power supply; and
   electronic circuitry arranged to control power delivery to one or more light sources;
   wherein the electronic circuitry comprises:
      control circuitry for controlling delivery of power from said input power connections to one or more light sources; and
      sensing circuitry configured to sense and obtain a measure of impedance of the external primary power supply circuit that is coupled, in use, to the primary input power connection by applying one or more voltage or current pulses to the primary input power connection;
   wherein the control circuitry is arranged to determine a present operating state of the one or more light sources;
   wherein the control circuitry is arranged to determine a new operating state of the one or more light sources using the determined present operating state of the one or more light sources and the measure of said impedance obtained from the sensing circuitry;
   wherein the control circuitry is arranged to control delivery of power to the one or more light sources in dependence upon the determined new operating state of the one or more light sources; and
   wherein the control circuitry is configured to control delivery of power to the one or more light sources dependent of presence of primary power at the primary input power connection such that if the determined operating state of the one or more light sources is off, then the control circuitry does not deliver power to the one or more light sources even when primary power for powering the one or more light sources is available at the primary input power connection.

2. A lighting control apparatus according to claim 1, wherein said control circuitry comprises a latching module arranged to maintain state information indicating the present operating state of the one or more light sources.

3. A lighting control apparatus according to claim 2, wherein the control circuitry is arranged to control the state information maintained by said latching module in dependence upon detected changes in impedance sensed by said sensing circuitry.

4. A lighting control apparatus according to claim 1, wherein said control circuitry is arranged to determine state information indicating a present illumination state of the one or more light sources.

5. A lighting control apparatus according to claim 1, wherein said control circuitry is arranged to determine present state information indicative of one of at least two different illumination levels of said one or more light sources.

6. A lighting control apparatus according to claim 1, wherein said control circuitry is arranged to determine present state information indicative of one of at least three or more different illumination levels of said one or more light sources.

7. A lighting control apparatus according to claim 6, wherein the control circuitry is arranged to generate control signals for controlling dimming of the one or more light sources in dependence upon changes in said sensed impedance and said determined operating state of the one or more light sources.

8. A lighting control apparatus according to claim 1, wherein the control circuitry is arranged to detect removal of a primary power supply from said primary input power connection and is arranged to use the sensed measure of impedance to distinguish between:
  i) removal of the primary supply from the primary input power connection by a user opening a switch coupled, in use, to the lighting control apparatus; and
  ii) primary power supply failure; and, upon detection of primary power supply failure, is configured to control power delivery to the one or more light sources using power received at the secondary input power connection to provide emergency lighting functionality.

9. A lighting control apparatus according to claim 8, wherein if the control circuitry is controlling power delivery such that no power is being delivered to the one or more light sources when primary power is initially available at the primary input power connection and the control circuitry subsequently detects primary power supply failure, the control circuitry is arranged to provide power to the one or more light sources using power from the secondary input power connection.

10. A lighting control apparatus according to claim 1, wherein the sensing circuitry is arranged to detect transient signals on the primary input power connection, from which the sensing circuitry determines said impedance measure.

11. A lighting control apparatus according to claim 1, wherein the electronic circuitry is arranged to use the impedance measure obtained from the sensing circuitry to determine if manually operable switches within the external primary power supply circuit that is coupled, in use, to the primary input power connection are in an open or a closed state.

12. A lighting control apparatus according to claim 1, wherein the electronic circuitry is arranged to determine a plurality of measurements of said external impedance and is arranged to combine two or more of said measurements to determine an average measurement.

13. A lighting control apparatus according to claim 1, provided in a housing adapted for connection to a lighting circuit.

14. A lighting control apparatus according to claim 1, wherein the control apparatus is arranged to send a control signal to one or more light sources to control delivery of power to the one or more light sources.

15. A lighting control apparatus according to claim 14, wherein the control apparatus is arranged to send said control signal to said one or more light sources over a wireless link or over a primary supply line connected, in use, to the primary input power connection.

16. A kit comprising:
  a lighting control apparatus according to claim 14 for generating and transmitting a control signal for controlling the application of power to one or more lighting devices; and
  one or more lighting devices, each of the one or more lighting devices comprising:
    one or more light sources;
    a primary input power connection for connection to a primary power supply;
    a secondary input power connection for receiving secondary power from a secondary power supply; and
    electronic circuitry arranged to receive the control signal from said control apparatus and arranged to control the delivery of power to the one or more light source(s) using power from the primary input power connection or using power from the secondary input power connection in dependence upon the control signal received from the control apparatus.

17. A lighting control apparatus according to claim 1, wherein the control circuitry is arranged to control when the sensing circuitry senses said external impedance.

18. A lighting control apparatus according to claim 17, wherein said control circuitry is arranged to cause said sensing circuitry to initiate sensing when the control circuitry detects an absence of primary power from the primary input power connection.

19. A lighting control apparatus according to claim 1, having a first mode of operation in which the control circuitry operates in a first operating mode and a second mode of operation in which the control circuitry operates in a second mode of operation and wherein the lighting control apparatus is arranged to operate in said first mode if the primary input power connection is connected to a primary power supply circuit that provides a substantially permanent primary power supply and is arranged to operate in said second mode if the primary input power connection is connected to a primary power supply circuit that uses manually operable toggle switches that remove the primary power supply from the primary input power connection.

20. A lighting control apparatus according to claim 19, wherein the lighting control apparatus is arranged to operate in said first mode if the primary input power connection is connected to a primary power supply circuit that uses manually operable momentary switches that, when activated by the user, momentarily remove primary power from the primary input power connection.

21. A lighting control apparatus according to claim 1, wherein the electronic circuitry comprises charging circuitry for using power obtained at the primary input power connection to charge the secondary power supply and wherein the control circuitry is arranged to cause the charging circuitry to initiate charging of the secondary power supply immediately after the primary power supply is restored to the primary input power connection following a primary power supply failure.

22. A lighting device comprising:
  one or more light sources; and
  a lighting control apparatus according to claim 1 for controlling the application of power to the one or more light sources.

23. A method of controlling power delivery to one or more light sources using a control apparatus, the method comprising:
  connecting a primary input power connection of the control apparatus to a primary power supply circuit that is external of the control apparatus;
  connecting a secondary input power connection of the control apparatus to a secondary power supply;
  sensing and obtaining a measure of impedance of the external power supply circuit that is connected to the primary input power connection by applying one or more voltage pulses or current pulses to the primary input power connection;
  using control circuitry of the control apparatus to determine a present operating state of the one or more light sources;
  using the control circuitry of the control apparatus to determine a new operating state of the one or more light sources, and using the determined present operating state of the one or more light sources and the measure of said impedance obtained from said sensing; and
  controlling delivery of power to the one or more light sources in dependence upon the determined operating state of the one or more light sources;

wherein the controlling controls delivery of power to the one or more light sources independent of the presence of primary power of the primary input power connection such that if the determined operating state of the one or more light sources is off, then the controlling does not deliver power to the one or more light sources even when primary power for powering the one or more light sources is available at the primary input power connection.

* * * * *